US012212942B2

(12) United States Patent
Fu et al.

(10) Patent No.: US 12,212,942 B2
(45) Date of Patent: Jan. 28, 2025

(54) SOUND OUTPUT DEVICE, SENSORY SOUND SOURCE ADJUSTMENT METHOD, AND VOLUME ADJUSTMENT METHOD

(71) Applicant: Shenzhen Shokz Co., Ltd., Shenzhen (CN)

(72) Inventors: Junjiang Fu, Shenzhen (CN); Lei Zhang, Shenzhen (CN); Fengyun Liao, Shenzhen (CN); Xin Qi, Shenzhen (CN)

(73) Assignee: Shenzhen Shokz Co., Ltd., Shenzhen (CN)

( * ) Notice: Subject to any disclaimer, the term of this patent is extended or adjusted under 35 U.S.C. 154(b) by 251 days.

(21) Appl. No.: 17/901,813

(22) Filed: Sep. 1, 2022

(65) Prior Publication Data

US 2023/0007399 A1 Jan. 5, 2023

Related U.S. Application Data

(63) Continuation of application No. PCT/CN2020/088524, filed on Apr. 30, 2020.

(51) Int. Cl.
*H04R 3/12* (2006.01)
*H04R 1/10* (2006.01)
*H04R 25/00* (2006.01)

(52) U.S. Cl.
CPC ............. *H04R 3/12* (2013.01); *H04R 1/1058* (2013.01); *H04R 25/606* (2013.01); *H04R 2460/13* (2013.01)

(58) Field of Classification Search
CPC ...... H04R 3/12; H04R 1/1058; H04R 25/606; H04R 2460/13; H04R 25/50;
(Continued)

(56) References Cited

U.S. PATENT DOCUMENTS

2006/0262954 A1* 11/2006 Lee .......................... H04M 1/03 381/380
2012/0008813 A1 1/2012 Rosen et al.
(Continued)

FOREIGN PATENT DOCUMENTS

CN 1658709 A 8/2005
CN 1805616 A 7/2006
(Continued)

OTHER PUBLICATIONS

International Search Report (Jan. 29, 2021).

*Primary Examiner* — Carolyn R Edwards
*Assistant Examiner* — Julie X Dang

(57) ABSTRACT

The present disclosure provides a sound output device, a sensory sound source adjustment method, and a volume adjustment method. The sensory sound source adjustment method includes: obtaining a volume difference between the first sound wave and the second sound wave; and adjusting a sound generation time difference between the first sound wave and the second sound wave. The volume adjustment method includes: obtaining a volume difference between the first sound wave and the second sound wave; and adjusting an amplitude difference between the first excitation and the second excitation. The sound output device and the sensory sound source adjustment method may correct an shift of a sensory sound source perceived by a user; and the sound output device and the volume adjustment method may correct a volume difference between a first speaker and a second speaker.

19 Claims, 6 Drawing Sheets

(58) Field of Classification Search
CPC ........ H04R 1/2803; H04R 9/025; H04R 1/02; H04R 3/00; H04R 11/02; H04R 3/14; H04R 2460/01; H04R 2410/05; H04R 1/2834; H04R 1/2849; H04R 2400/03
USPC ........ 381/151, 351, 396, 174, 355, 326, 190
See application file for complete search history.

(56) References Cited

U.S. PATENT DOCUMENTS

| | | | | |
|---|---|---|---|---|
| 2012/0189150 | A1 | 7/2012 | Thome | |
| 2014/0056455 | A1 * | 2/2014 | Sakaguchi ............... | H04R 1/10 381/328 |
| 2015/0170633 | A1 | 6/2015 | Nakagawa et al. | |
| 2017/0026751 | A1 | 1/2017 | Suzuki et al. | |
| 2017/0127183 | A1 | 5/2017 | Ren et al. | |
| 2017/0257723 | A1 | 9/2017 | Morishita et al. | |
| 2017/0289729 | A1 * | 10/2017 | Oh ........................... | H04S 5/00 |

FOREIGN PATENT DOCUMENTS

| | | | | | |
|---|---|---|---|---|---|
| CN | 1812653 | A | | 8/2006 | |
| CN | 1819717 | A | | 8/2006 | |
| CN | 1867208 | A | | 11/2006 | |
| CN | 101867852 | A | | 10/2010 | |
| CN | 102696244 | A | | 9/2012 | |
| CN | 105556990 | A | | 5/2016 | |
| CN | 106105255 | A | | 11/2016 | |
| CN | 107211207 | A | | 9/2017 | |
| CN | 109547906 | A | * | 3/2019 | ............. H04R 1/023 |
| CN | 110262768 | A | | 9/2019 | |
| CN | 209358770 | U | | 9/2019 | |
| EP | 3122062 | A | | 1/2017 | |
| EP | 3122062 | A1 | * | 1/2017 | ........... H04R 25/606 |
| JP | H06-121395 | A | | 4/1994 | |
| JP | 11103495 | A | | 4/1999 | |
| JP | 2001-028800 | A | | 1/2001 | |
| JP | 2006157106 | A | | 6/2006 | |
| KR | 20020043617 | A | | 6/2002 | |
| KR | 20170062853 | A | | 6/2017 | |
| KR | 20180039150 | A | | 4/2018 | |
| RU | 2580623 | C1 | | 4/2016 | |
| RU | 2754382 | C1 | | 9/2021 | |
| WO | 2009110705 | A2 | | 9/2009 | |
| WO | 2013030437 | A1 | | 3/2013 | |
| WO | 2015-141402 | A1 | | 9/2015 | |
| WO | 2016192277 | A1 | | 12/2016 | |
| WO | 2019237727 | A1 | | 12/2019 | |

* cited by examiner

SOUND OUTPUT DEVICE, SENSORY SOUND SOURCE ADJUSTMENT METHOD, AND VOLUME ADJUSTMENT METHOD

RELATED APPLICATIONS

This application is a continuation application of PCT application No. PCT/CN2020/088524, filed on Apr. 30, 2020, and the content of which is incorporated herein by reference in its entirety.

TECHNICAL FIELD

The present disclosure relates to the acoustic field, and in particular, to a sound output device, a sensory sound source adjustment method, and a volume adjustment method.

BACKGROUND

When a bone-conduction earphone is in use, an amplitude of a bone-conduction speaker is in positive correlation with sound volume generated by the bone-conduction speaker. Mass of a housing of the bone-conduction speaker has an obvious impact on the amplitude of the bone-conduction speaker, and further affects the sound volume generated by the speaker. When designing a bone-conduction earphone, additional functional modules such as a headset microphone (for example, a microphone with an extension rod) and buttons sometimes need to be arranged on only one side of a bone-conduction speaker and not on the other side. The arrangement of the buttons on the bone-conduction speaker changes mass distribution of the bone-conduction speaker, and therefore affects sound volume generated by the speaker. In addition, the functional modules such as the headset microphone or buttons only need to be arranged on one side. Therefore, this arrangement may result in volume difference between speakers on the two sides (a speaker volume in one ear is high but a speaker volume in the other ear is low), and may further result in a sensory sound source shift. If there is a great difference in volume between a speaker on the left side and a speaker on the right side, long-term use of the earphone may cause hearing impairments. Therefore, a sensory sound source (also referred to as virtual sound source) needs to be adjusted, so that the sensory sound source is centered, or volume of the speakers of the earphone on both sides needs to be adjusted, so that the volume of the speakers on both sides is identical. Thus, there exist the needs for a sound output device, a sensory sound source adjustment method, and a volume adjustment method to achieve the above-mentioned goals.

SUMMARY

The following presents a brief summary of the present disclosure to provide a basic understanding about some exemplary embodiments of the present disclosure. It should be understood that the summary is neither intended to identify key or critical parts of the present disclosure nor intended to limit the scope of the present disclosure. Its sole purpose is to present some concepts in the present disclosure in a simplified form as a prelude to the more detailed description that is discussed later in the present disclosure.

A bone-conduction earphone may include a left bone-conduction speaker and a right bone-conduction speaker. As described above, for the bone-conduction earphone, functional modules added to the bone-conduction speaker on one side may increase mass of a housing of the bone-conduction speaker. Consequently, volume of the speaker on the side with increased mass may be reduced. Assuming the functional modules are disposed on the left bone-conduction speaker, then volume of the left bone-conduction speaker may be different from that of the right bone-conduction speaker. An obvious sensory sound source shift may result from a great volume difference between the left speaker and the right speaker, and long-term use of the earphone may even cause hearing impairments.

To resolve technical problems of a volume difference and sensory sound source shift resulted from uneven mass distribution of speakers of a bone-conduction earphone on two sides, the present disclosure discloses a sound output device, including: a signal processing circuit to generate, during operation, a first electrical signal and a second electrical signal based on target sound information; a first speaker, electrically connected to the signal processing circuit to receive, during operation, the first electrical signal from the signal processing circuit and convert the first electrical signal into a first sound wave; and a second speaker, electrically connected to the signal processing circuit, to receive, during operation, the second electrical signal from the signal processing circuit and convert the second electrical signal into a second sound wave, where the sound output device converts the target sound information into the first sound wave in a first duration and further converts the target sound information into the second sound wave in a second duration, and the first duration is shorter than the second duration by a time difference.

The present disclosure further discloses a sound output device, including: a signal processing circuit to generate, during operation, a first electrical signal and a second electrical signal based on target sound information; a first speaker, electrically connected to the signal processing circuit to receive, during operation, the first electrical signal from the signal processing circuit and convert the first electrical signal into a first excitation to excite a first mechanical structure to generate a first sound wave; and a second speaker, electrically connected to the signal processing circuit to receive, during operation, the second electrical signal from the signal processing circuit and convert the second electrical signal into a second excitation to excite a second mechanical structure to generate a second sound wave, where volume of the first sound wave is the same as volume of the second sound wave, and given a same excitation, sound volume generated by the first mechanical structure is lower than sound volume generated by the second mechanical structure.

The present disclosure further discloses a sensory sound source adjustment method for a sound output device, including: obtaining a volume difference between a first sound wave and a second sound wave generated by the sound output device, the sound output device including: a signal processing circuit to generate, during operation, a first electrical signal and a second electrical signal based on target sound information, a first speaker, electrically connected to the signal processing circuit to receive, during operation, the first electrical signal from the signal processing circuit and convert the first electrical signal into the first sound wave, and a second speaker, electrically connected to the signal processing circuit to receive, during operation, the second electrical signal from the signal processing circuit and convert the second electrical signal into the second sound wave, where the sound output device converts the target sound information into the first sound wave in a first duration and the sound output device converts the target sound information into the second sound wave in a second duration, and the first duration is shorter than the second duration by a time difference; and adjusting the time difference.

This application further discloses a sound output device, including:

This application further discloses a sensory sound source adjustment method. The sensory sound source adjustment method is configured to adjust sensory sound sources of a first speaker and a second speaker of a sound output device and includes:

As described above, in view of the technical problems of a volume difference and sensory sound source shift caused by uneven mass distribution of speakers of a bone-conduction earphone on two sides, the present disclosure provides a sound output device and a sensory sound source adjustment method. Through setting a time difference between a first sound wave and a second sound wave, a shift of a sensory sound source perceived by a user resulting from a mass difference between a first mechanical structure of the left speaker and a second mechanical structure of the right speaker may be corrected.

The present disclosure further provides a sound output device and a volume adjustment method. A volume difference between the left speaker and the right speaker, which is caused by a mass difference between the first mechanical structure of the left speaker and the second mechanical structure of the right speaker, may be corrected by setting different coil resistivities, coil winding diameters, magnetic field strengths, and/or resistances.

BRIEF DESCRIPTION OF DRAWINGS

The following drawings describe in detail some exemplary embodiments disclosed in the present disclosure. Same reference numerals represent similar structures in several views of the drawings. A person of ordinary skill in the art understands that these embodiments are non-restrictive and exemplary embodiments. The drawings are only for illustration and description purposes, and are not intended to limit the scope of the present disclosure. Embodiments in other ways may also achieve the intention of the present disclosure. It should be understood that the drawings are not drawn to scale.

DETAILED DESCRIPTION

The following description provides some application scenarios and requirements of the present disclosure, to enable a person skilled in the art to manufacture and use content of the present disclosure. In view of the following description, these features and other features of the present disclosure, operations and functions of related elements of structures, and combinations of components and economics of manufacturing thereof may be significantly improved. With references to the drawings, all of these form a part of the present disclosure. However, it should be clearly understood that the drawings are only for illustration and description purposes and are not intended to limit the scope of the present disclosure. For a person skilled in the art, various partial modifications to the disclosed exemplary embodiments are obvious, and general principles defined herein can be applied to other exemplary embodiments and applications without departing from the spirit and scope of the present disclosure. Therefore, the present disclosure is not limited to the illustrated exemplary embodiments, but is to be accorded the widest scope consistent with the claims.

In the present disclosure, a bone-conducted sound wave may be a sound wave conducted from a mechanical vibration to an ear through bones (also referred to as bone-conducted sound), and an air-conducted sound wave may be a sound wave conducted from a mechanical vibration to an ear through air (also referred to as air-conducted sound).

In some exemplary embodiments, the present disclosure provides a volume adjustment method. The volume adjustment method may be used to adjust volume of a sound wave output by a sound output device. The sound wave may include a bone-conducted sound wave and an air-conducted sound wave. The sound output device may include but is not limited to an earphone, a hearing aid, a helmet, or the like, or any combination thereof. The earphone may include but is not limited to a wired earphone, a wireless earphone, a Bluetooth earphone, or the like, or any combination thereof. The earphone may include but is not limited to a bone-conduction speaker or an air-conduction speaker.

Figure 1:
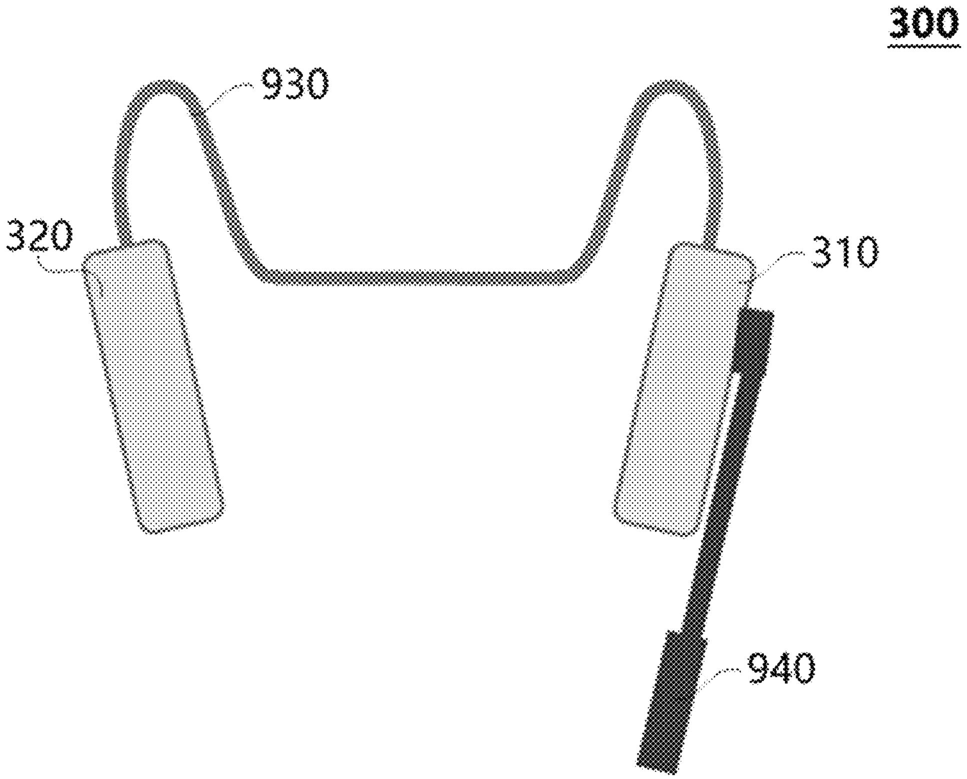
FIG. 1 is a perspective view of a sound output device according to some exemplary embodiments of the present disclosure.
Figure 2:
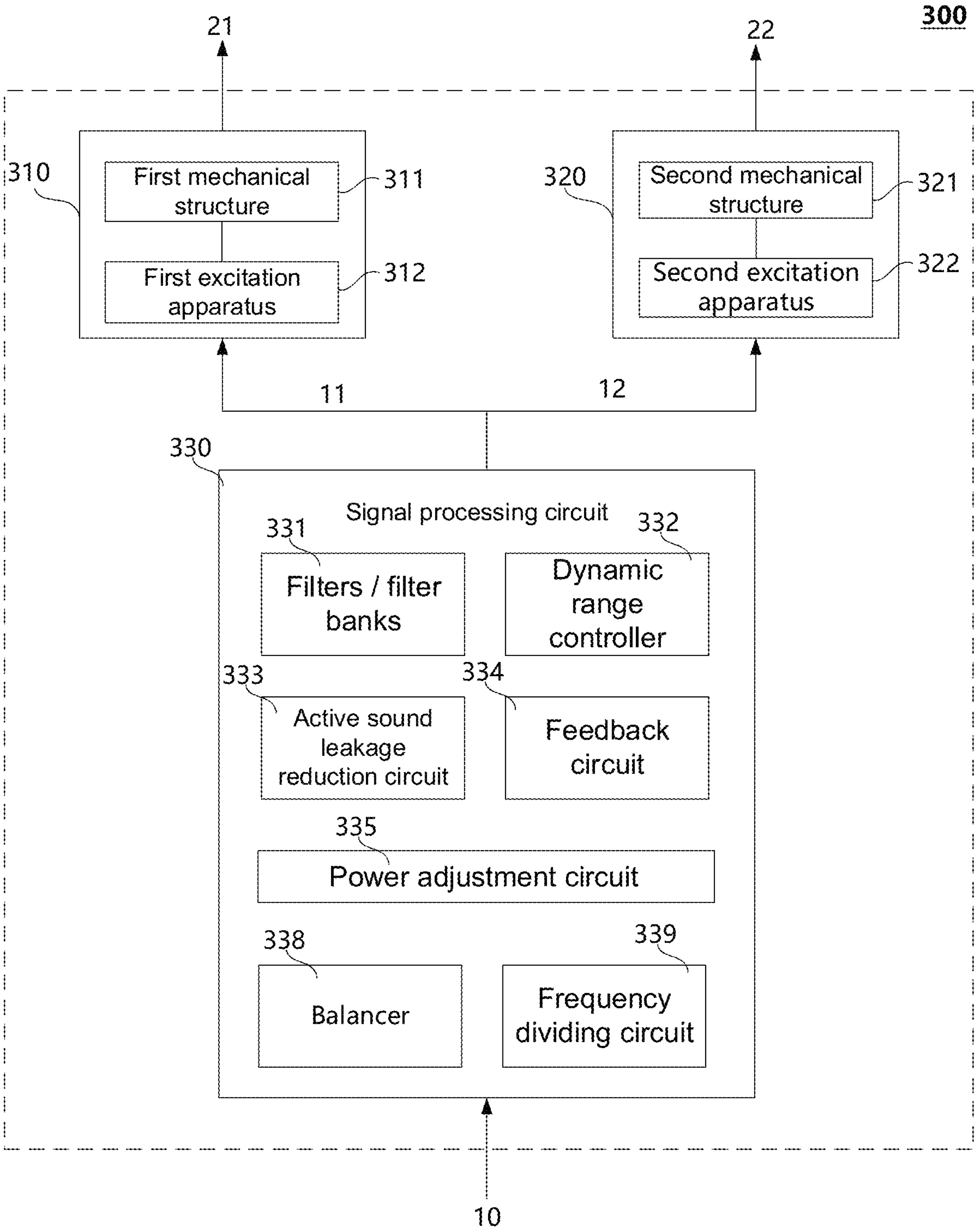
FIG. 2 is a schematic structural diagram of a sound output device according to some exemplary embodiments of the present disclosure.

FIG. 1 is a perspective view of a sound output device 300 according to some exemplary embodiments of the present disclosure. FIG. 2 is a schematic structural diagram of a sound output device 300 according to some exemplary embodiments of the present disclosure. Referring to FIG. 2, the sound output device 300 may include a first speaker 310, a second speaker 320, and a signal processing circuit 330.

The signal processing circuit 330 may receive target sound information 10, process the target sound information 10, and generate a first electrical signal 11 and a second electrical signal 12.

The target sound information 10 may include a video file or an audio file, or a combination thereof, having a specific data format, or data or a file that may be converted into sound by specific means. The target sound information 10 may come from a storage medium of the sound output device 300, or may come from an information generation, storage, or transfer system other than the sound output device 300. The target sound information 10 may include at least one of: an electrical signal, an optical signal, a magnetic signal, a mechanical signal, or the like. The target sound information 10 may come from a signal source or a plurality of signal sources. The plurality of signal sources may be correlated or may be uncorrelated. In some exemplary embodiments, the signal processing circuit 330 may obtain the target sound information 10 in a plurality of different manners. The target sound information 10 may be obtained through a wired or wireless connection, and may be obtained in real time or after a delay. For example, the sound output device 300 may receive the target sound information 10 through a wired or wireless connection, or may directly obtain data from a storage medium and generate the target sound information 10. For another example, the sound output device 300 may include a component having a sound capture function, pick an ambient sound and convert a mechanical vibration of the ambient sound into an electrical signal, and obtain, by using an amplification processor, an electrical signal satisfying a specific requirement. In some exemplary embodiments, the wired connection may include a metal cable, an optical cable, or a metal-optical composite cable, for example, the wired connection may be at least one of: a coaxial cable, a telecommunications cable, a flexible cable, a spiral cable, a nonmetallic sheathed cable, a metallic sheathed cable, a multi-core cable, a twisted-pair cable, a ribbon cable, a shielded cable, a simplex cable, a duplex cable, a parallel double-core conducting wire, a twisted pair, or the like. The foregoing examples are used only for ease of description. A transmission medium in the wired connection may also be of another type, for example, another carrier for transmitting an electrical signal or an optical signal. The wireless connection may include at least one of: radio communication, free space optics communication, sound communication, electromagnetic induction, or the like. Radio communication may include IEEE 802.11 series standards, IEEE 802.15 series standards (for example, a Bluetooth technology and a cellular technology), a first generation mobile communications technology, a second generation mobile communications technology (for example, FDMA, TDMA, SDMA, CDMA, and SSMA), a general packet radio service technology, a third generation mobile communications technology (for example, CDMA2000, WCDMA, TD-SCDMA, and WiMAX), a fourth generation mobile communications technology (for example, TD-LTE and FDD-LTE), satellite communications (for example, a GPS technology), near field communications (NFC), and other technologies running on an ISM frequency band (for example, 2.4 GHz). Free space optics communication may include visible light, an infrared signal, and the like. Sound communication may include a sound wave, an ultrasonic signal, and the like. Electromagnetic induction may include a near field communications technology and the like. The foregoing examples are used only for ease of description. A transmission medium in the wireless connection may also be of another type, for example, a Z-wave technology, or other charging civil radio frequency bands and military radio frequency bands. For example, in some exemplary embodiments, the sound output device 300 may obtain the target sound information 10 from another device by using the Bluetooth technology.

In some exemplary embodiments, to enable a first sound wave 21 and a second sound wave 22 to have a specific output feature (for example, a frequency, a phase, and/or an amplitude, et cetera), the signal processing circuit 330 may process the target sound information 10, so that the first electrical signal 11 and the second electrical signal 12 output by the signal processing circuit 330 may respectively include specific frequency components.

In some exemplary embodiments, multiple filters or filter banks 331 may be disposed in the signal processing circuit 330. The multiple filters or filter banks 331 may process received electrical signals and output electrical signals with various frequencies. The filters or filter banks 331 may include but are not limited to analog filters, digital filters, passive filters, active filters, or the like, or any combination thereof. In some exemplary embodiments, a dynamic range controller 332 may be disposed in the signal processing circuit 330. The dynamic range controller 332 may be configured to compress and/or amplify an input signal, so that sound may be gentler or louder. In some exemplary embodiments, an active sound leakage reduction circuit 333 may be disposed in the signal processing circuit 330 to reduce sound leakage of the sound output device 300. In some exemplary embodiments, a feedback circuit 334 may be disposed in the signal processing circuit 330. The feedback circuit 334 may return sound field information to the signal processing circuit 330. In some exemplary embodiments, a power adjustment circuit 335 may be disposed in the signal processing circuit 330 to adjust an amplitude of a received electrical signal. The power adjustment circuit 335 may include a power amplification circuit to amplify signals such as the first electrical signal 11 and/or the second electrical signal 12. The power adjustment circuit 335 may further include a power attenuation circuit to attenuate signal amplitudes of the first electrical signal 11 and/or the second electrical signal 12. In some exemplary embodiments, a balancer 338 may be disposed in the signal processing circuit 330. The balancer 338 may be configured to perform gain or attenuation on received signals independently based on a specific frequency band. In some exemplary embodiments, the signal processing circuit 330 may include a frequency dividing circuit 339. The frequency dividing circuit may decompose a received electrical signal into a high-frequency signal component and a low-frequency signal component.

The first speaker 310 may be electrically connected to the signal processing circuit 330. The first speaker 310 may receive the first electrical signal 11 from the signal processing circuit 330 and convert the first electrical signal 11 into the first sound wave 21. The first speaker 310 may be an energy conversion device. In some exemplary embodiments, the first speaker 310 may convert the received first electrical signal 11 into a mechanical vibration. Further, the first sound wave 21 may be generated by the mechanical vibration. For example, the first speaker 310 may include a first mechanical structure 311 and a first excitation device 312. In some exemplary embodiments, the first speaker 310 may be a bone-conduction speaker; or the first speaker 310 may include an air-conduction speaker, or a combination of a bone-conduction speaker and an air-conduction speaker.

The first excitation device 312 may be an input end of the energy conversion device. The first excitation device 312 may receive the first electrical signal 11 from the signal processing circuit 330 and convert the first electrical signal 11 into a first excitation. The first excitation may excite the first mechanical structure 311 to vibrate. In other words, by using the first excitation device 312 and the first mechanical structure 311, the first speaker 310 may convert electric energy of the received first electrical signal 11 into mechanical energy of the vibration of the first mechanical structure 311.

A first excitation device 312 may generate the first excitation to excite a first mechanical structure 311 to vibrate. In some exemplary embodiments, the first excitation device 312 may be an electromagnetic excitation device. The first excitation may be a magnetic force, an electromagnetic force, and/or an Ampere force generated by the electromagnetic excitation device. Certainly, the first excitation device 312 may also be other types of excitation devices, and is not specifically limited in the present disclosure. The excitation device may receive a first electrical signal 11 from a signal processing circuit 330 and generates a first excitation. The first excitation generated by the excitation device may be generated by at least one of the following manners: a moving coil manner, an electrostatic manner, a piezoelectric manner, a moving-iron manner, a pneumatic manner, an electromagnetic manner, or the like.

Figure 3:
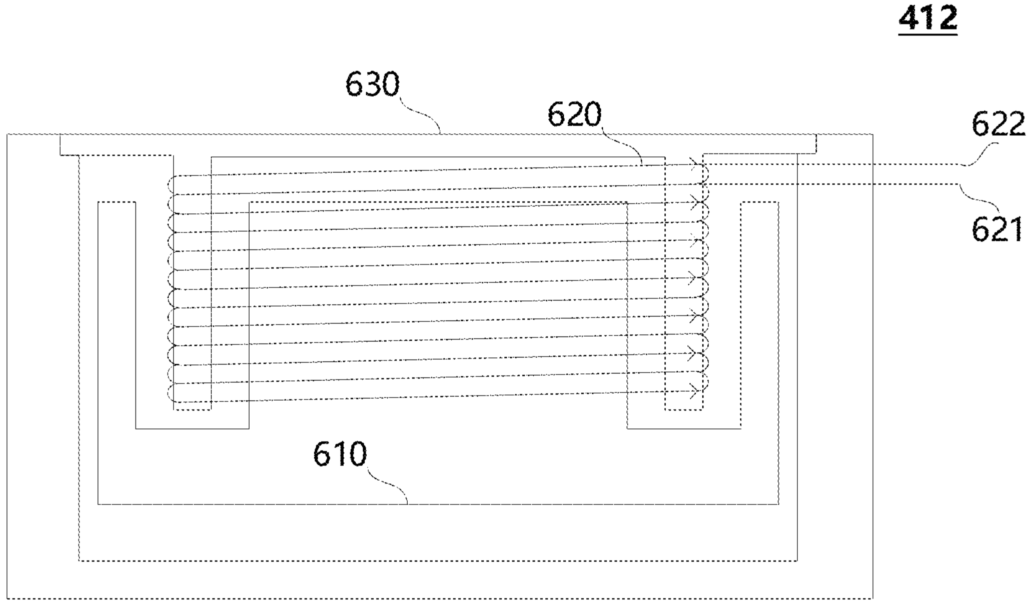
FIG. 3 is a schematic structural diagram of an electromagnetic excitation device according to some exemplary embodiments of the present disclosure.

For example, FIG. 3 is a schematic structural diagram of a first excitation device 412 according to some exemplary embodiments of the present disclosure. The first excitation device 412 shown in FIG. 3 may be an electromagnetic excitation device. In some exemplary embodiments, the first excitation device 412 may include a magnetic member 610 and a coil 620.

The magnetic member 610 may generate a magnetic field with a magnetic field strength. In some exemplary embodiments, the magnetic field strength of the magnetic member 610 may be constant. The magnetic member 610 may include a permanent magnet or may be made of a permanent magnet. The permanent magnet may be a natural magnet or may be an artificial magnet. For example, the permanent magnet may include but is not limited to an NdFeB magnet, an SmCo magnet, an AlNiCo magnet, or the like, or any combination thereof. The permanent magnet may have a coercive force as high as possible, remanence, and a maximum magnetic energy product, to ensure that the permanent magnet has a stable magnetic field and may store maximum magnetic energy.

The coil 620 may be a winding including at least one wire winding in a direction. The coil 620 may be disposed in the magnetic field generated by the magnetic member 610. The coil 620 may include a first end 621 and a second end 622. An electrical signal may enter the coil 620 in a form of a current from the first end 621, pass through the coil 620, and flow out of the coil 620 from the second end 622.

The energized coil 620 may experience an Ampere force in the magnetic field. In addition, a value of the Ampere force may be determined by $F=B\cdot I\cdot L$. F indicates the value of the Ampere force experienced by the coil 620; and a direction of F may be determined based on the Ampere's rule. F may drive the coil 620 to vibrate. The coil 620 may be connected to a mechanical structure 630. Further, the coil 620 may drive the mechanical structure 630 to generate a vibration. For example, the mechanical structure 630 may be a first mechanical structure 311 generating a first sound wave 21. In other words, F may be used as an external excitation signal to excite the first mechanical structure 311 to generate a vibration.

B is a magnetic field strength of the magnetic field generated by the magnetic member 610. A value of the magnetic field strength of the magnetic field generated by the magnetic member 610 may be related to a material of the magnetic member 610. In some exemplary embodiments, the value of the magnetic field strength B generated by the magnetic member 610 may be in positive correlation with the coercive force, remanence, and the maximum magnetic energy product of the magnetic member 610.

I is a value of the current passing through the coil 620. I is related to the electrical signal received by the first excitation device 412. Generally, the electrical signal is input in a form of an impulse voltage to the coil 620. $U_t$ indicates a value of an impulse voltage between the first end 621 and the second end 622 of the coil 620 (that is, an electrical signal input to an electromagnetic excitation device 600). The current I passing through the coil 620 may be expressed as $$I = \frac{U_t}{R}.$$

R indicates a value of a resistance between the first end 621 and the second end 622. The value of the resistance between the first end 621 and the second end 622 may be obtained through calculation based on $$R = \frac{\rho L}{S}.$$

Where ρ indicates a winding resistivity of the coil 620; L indicates a length of the coil 620; and S indicates a winding diameter of the coil 620.

As described above, a value of an excitation F (that is, the Ampere force received by the coil) generated in the first excitation device 412 may be expressed as:

$$F = B \cdot I \cdot L = \frac{BU_tL}{R} = \frac{BU_tS}{\rho} \quad \text{formula (1)}$$

Still referring to FIG. 2, the first mechanical structure 311 may be an output end of the energy conversion device. The first mechanical structure 311 may vibrate to generate the first sound wave 21. The first mechanical structure 311 may generate a mechanical vibration when excited by the first excitation; and further, the first sound wave 21 may be generated based on the mechanical vibration. In some exemplary embodiments, the first mechanical structure 311 may be a component that generates sound directly by vibrating after being excited. For example, when the first speaker is a bone-conduction speaker, the first mechanical structure 311 may be a housing of the bone-conduction speaker. When the first speaker is a moving coil air-conduction speaker, the first mechanical structure 311 may include a woolen cone or a paper cone of the moving coil air-conduction speaker.

Because the first sound wave 21 is generated by the vibration of the first mechanical structure 311, to analyze features of the first sound wave 21, a vibration process of the first mechanical structure 311 is analyzed. Next, the vibration process of the first mechanical structure 311 is analyzed in the present disclosure by using a non-limiting example in which the first speaker 310 is a bone-conduction speaker.

Figure 4:
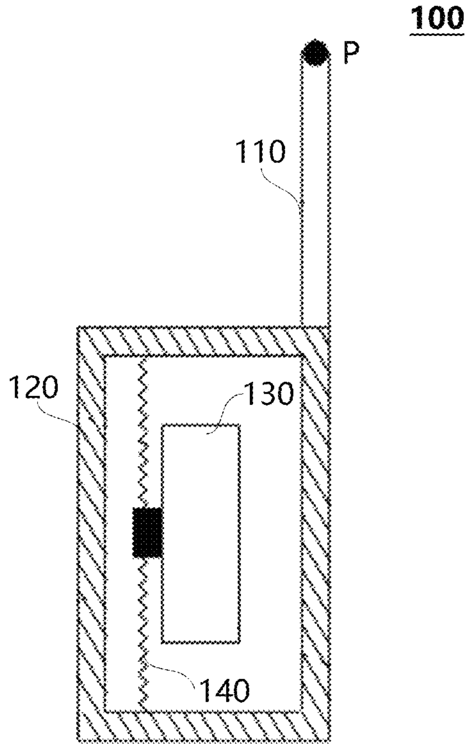
FIG. 4 is a schematic structural diagram of a bone-conduction speaker according to some exemplary embodiments of the present disclosure.

FIG. 4 is a schematic structural diagram of a bone-conduction speaker 100 according to some embodiments of the present disclosure. The bone-conduction speaker 100 may include a housing 120 and a magnetic circuit 130.

The magnetic circuit 130 may be used as an excitation device for generating an excitation f. The magnetic circuit 130 and the housing 120 are connected by a vibrating piece 140.

The housing 120 may be connected to an ear mount 110. A top point P of the ear mount 110 may fit onto a head of a user. Therefore, the top point P may be a fixing point. In some exemplary embodiments referring to FIG. 5, when the bone-conduction speaker 100 is in use, the housing 120 may vibrate under action of the excitation f, and generate a sound wave. Based on interaction of forces, in a vibration process of the housing 120, the magnetic circuit 130 may also experience an acting force in which value is the same as that of f and a direction is opposite to that of f (that is, "−f" shown in FIG. 5). For ease of analyzing a relationship between the sound wave generated by the bone-conduction speaker 100 and the housing 120 and the magnetic circuit 130, the housing 120 and the magnetic circuit 130 may be simplified as a vibrating system with two degrees of freedom.

Figure 5:
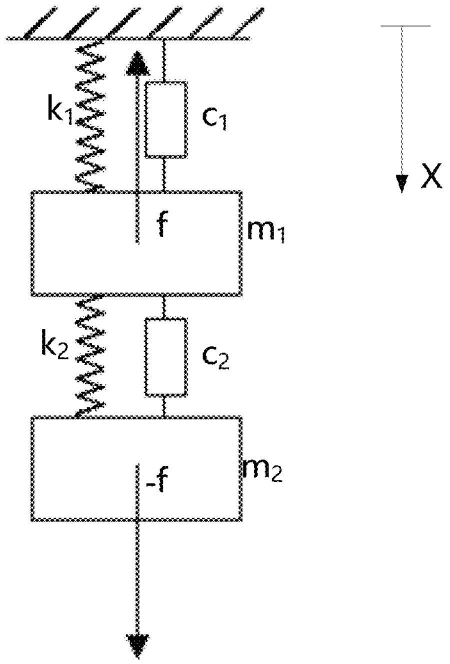
FIG. 5 is a schematic diagram of a vibration model of a bone-conduction speaker according to some exemplary embodiments of the present disclosure.

FIG. 5 is a model of a vibrating system with two degrees of freedom according to some exemplary embodiments of the present disclosure. In the model shown in FIG. 5, mass $m_1$ may represent a housing 120; mass $m_2$ may represent a magnetic circuit 130; an elastic connection member $k_1$ may represent a vibrating piece 140; and an elastic connection member $k_2$ may represent an ear mount 110. Damping of the elastic connection member $k_1$ is $c_1$ and that of $k_2$ is $c_2$. The housing 120 and the magnetic circuit 130 may generate vibrations under action of the force f and the force −f. f is a value of a system excitation, and a direction off is shown in FIG. 5. A composite vibrating system composed of the housing 120, the magnetic circuit 130, the vibrating piece 140, and the ear mount 110 may be fixed at the top point P of the ear mount 110.

In some exemplary embodiments, the housing 120 and the magnetic circuit 130 may be respectively used as objects for dynamics analysis, and a dynamics equation of the model of the vibrating system with two degrees of freedom shown in FIG. 5 may be obtained:

$$\begin{bmatrix} m_1 & 0 \\ 0 & m_2 \end{bmatrix}\begin{Bmatrix} \ddot{x}_1 \\ \ddot{x}_2 \end{Bmatrix} + \begin{bmatrix} c_1+c_2 & -c_2 \\ -c_2 & c_2 \end{bmatrix}\begin{Bmatrix} \dot{x}_1 \\ \dot{x}_2 \end{Bmatrix} + \begin{bmatrix} k_1+k_2 & -k_2 \\ -k_2 & k_2 \end{bmatrix}\begin{Bmatrix} x_1 \\ x_2 \end{Bmatrix} = \begin{Bmatrix} -f \\ f \end{Bmatrix} \qquad \text{formula (2)}$$

As may be known from Fourier transform, any excitation f may be expressed as a sum of a series of simple harmonic vibrations in a frequency domain. Therefore, assuming $$F = \begin{Bmatrix} -f \\ f \end{Bmatrix} = F_0 e^{j\omega t}\begin{Bmatrix} -1 \\ 1 \end{Bmatrix},$$

where $F_0$ is an excitation amplitude, a steady state response of the system may be expressed as $$X = \begin{Bmatrix} x_1 \\ x_2 \end{Bmatrix} = e^{j\omega t}\begin{Bmatrix} X_1 \\ X_2 \end{Bmatrix}, \text{ where } \begin{Bmatrix} X_1 \\ X_2 \end{Bmatrix}$$

is a response amplitude.

F and X are substituted into the formula (2) to obtain a formula (3).

$$\left\{-\omega^2\begin{bmatrix} m_1 & 0 \\ 0 & m_2 \end{bmatrix} + \omega\begin{bmatrix} c_1+c_2 & -c_2 \\ -c_2 & c_2 \end{bmatrix} + \begin{bmatrix} k_1+k_2 & -k_2 \\ -k_2 & k_2 \end{bmatrix}\right\}\begin{Bmatrix} X_1 \\ X_2 \end{Bmatrix} = F_0\begin{Bmatrix} -1 \\ 1 \end{Bmatrix} \qquad \text{formula (3)}$$

A mechanical impedance matrix Z(ω) is introduced:

$$Z(\omega) = -\omega^2\begin{bmatrix} m_1 & 0 \\ 0 & m_2 \end{bmatrix} + \omega\begin{bmatrix} c_1+c_2 & -c_2 \\ -c_2 & c_2 \end{bmatrix} + \begin{bmatrix} k_1+k_2 & -k_2 \\ -k_2 & k_2 \end{bmatrix}$$
$$= \begin{bmatrix} -m_1\omega^2 + (c_1+c_2)\omega + k_1 + k_2 & -c_2\omega - k_2 \\ -c_2\omega - k_2 & -m_2\omega^2 + c_2\omega + k_2 \end{bmatrix}$$
$$= \begin{bmatrix} Z_{11}(\omega) & Z_{12}(\omega) \\ Z_{21}(\omega) & Z_{22}(\omega) \end{bmatrix}$$

The mechanical impedance matrix Z(ω) is substituted into the formula (3), to solve the formula and obtain a response amplitude of the vibrating system:

$$\begin{Bmatrix} X_1 \\ X_2 \end{Bmatrix} = [Z(\omega)]^{-1}\begin{Bmatrix} -F_0 \\ F_0 \end{Bmatrix}$$

where $$[Z(\omega)]^{-1} = \frac{1}{det[Z(\omega)]}\begin{bmatrix} Z_{22}(\omega) & -Z_{12}(\omega) \\ -Z_{12}(\omega) & Z_{11}(\omega) \end{bmatrix} = \frac{1}{Z_{11}(\omega)Z_{12}(\omega) - Z_{12}^2(\omega)}\begin{bmatrix} Z_{22}(\omega) & -Z_{12}(\omega) \\ -Z_{12}(\omega) & Z_{11}(\omega) \end{bmatrix}$$

Therefore, the response amplitude of the vibrating system may be obtained:

$$X_1(\omega) = -\frac{Z_{22}(\omega) + Z_{12}(\omega)}{Z_{11}(\omega)Z_{12}(\omega) - Z_{12}^2(\omega)}F_0 \qquad \text{formula (4)}$$

$$X_2(\omega) = \frac{Z_{12}(\omega) + Z_{11}(\omega)}{Z_{11}(\omega)Z_{12}(\omega) - Z_{12}^2(\omega)}F_0 \qquad \text{formula (5)}$$

The housing 120 vibrates to generate a sound wave. Therefore, the housing 120 (that is, the mass $m_1$) is analyzed. The mechanical impedance matrix Z(ω) is substituted into the formula (4), to obtain a response amplitude of the housing 120:

$$X_1(\omega) = \frac{-m_2\omega^2}{(c_2\omega^3 + k_2\omega^2)m_1 - (c_1c_2^2)\omega^2 - (k_1c_2 + 4k_2c_2 + c_1k_2)\omega - k_1k_2 - 2k_2^2}F_0 \qquad \text{formula (6)}$$

As may be seen from the formula (6), under a forced vibration, an amplitude $X_1$ of the housing 120 may be affected by the following parameters: a frequency of the excitation f (the value is equal to 1/ω), an amplitude $F_0$ of the excitation f, the mass $m_1$ of the housing 120, the mass $m_2$ of the magnetic circuit 130, rigidity $k_1$ and damping $c_1$ of the vibrating piece 140, and rigidity $k_2$ and damping $c_2$ of the ear mount 110. For example, when other parameters remain unchanged, the amplitude $F_0$ of the excitation f is positively proportional to the amplitude $X_1$ of the housing 120. When the amplitude $F_0$ of the excitation f increases, the amplitude $X_1$ of the housing 120 also increases. For another example, when other parameters remain unchanged, when the mass $m_1$ of the housing 120 of the bone-conduction speaker 100 increases, the amplitude $X_1$ of the housing 120 decreases; and when the mass $m_2$ of the magnetic circuit 130 increases, the amplitude $X_1$ of the housing 120 increases. Therefore, when the foregoing parameters change, the amplitude $X_1$ of the housing 120 also changes accordingly. Assuming there is no differences in transmission media and transmission distances, the amplitude $X_1$ of the housing 120 is positively proportional to volume of the sound wave generated by the vibration of the housing 120. When the amplitude $X_1$ increases, the volume of the sound wave increases; or when the amplitude $X_1$ decreases, the volume of the sound wave decreases.

Figure 6:
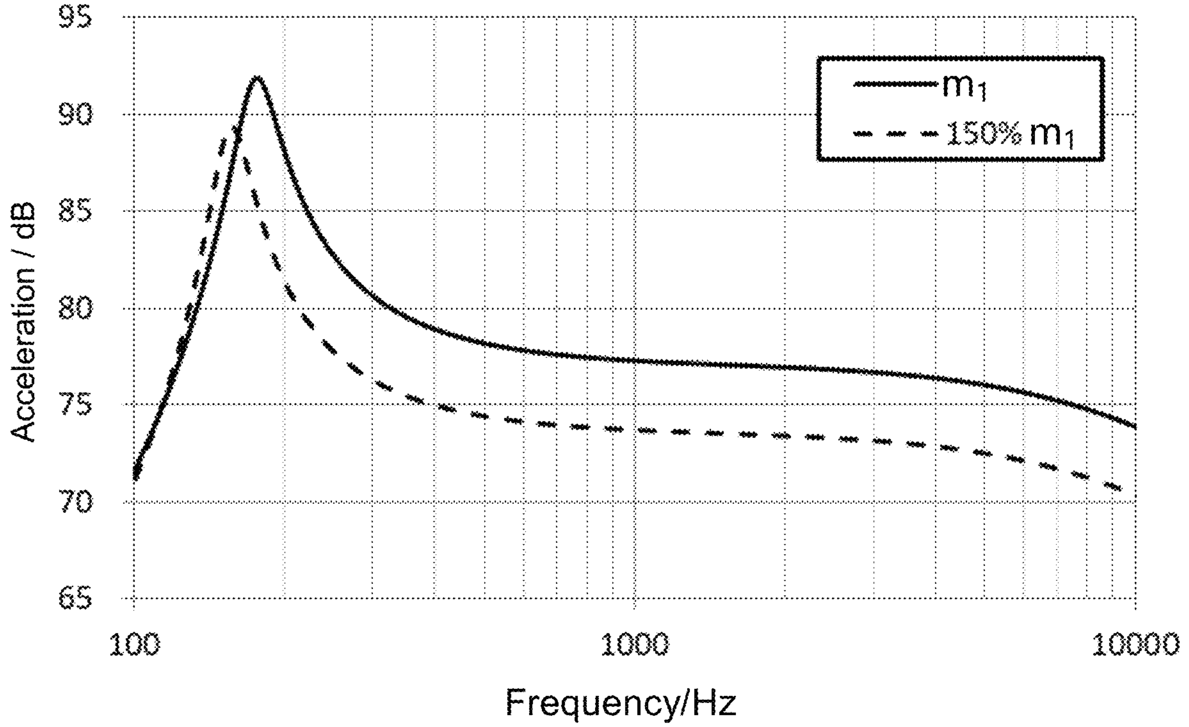
FIG. 6 is a diagram showing a vibration test result of a housing while in use according to some exemplary embodiments of the present disclosure.

FIG. 6 is a diagram showing a vibration test result of a housing 120 when a bone-conduction speaker 100 is in use according to some exemplary embodiments of the present disclosure. In a vibration test, physical quantities used for evaluating a value of a vibration or volume may include but are not limited to a speed, a displacement, a sound pressure level, and the like of a vibration source. For example, in the vibration test shown in FIG. 6, an acceleration level (unit: dB) of the vibration source is used as a physical quantity for evaluating a vibration. In FIG. 6, a solid line shows a vibration acceleration level of the bone-conduction speaker 100 changes with respect to a frequency of an excitation f when mass of the housing 120 is $m_1$; and a dashed line shows the vibration acceleration level of the bone-conduction speaker 100 changes with respect to the frequency of the excitation f after the mass $m_1$ of the housing 120 is increased by 50%.

As may be seen from FIG. 6, the vibration acceleration level of the housing 120 is related to the frequency and mass. Comparing with a vibration acceleration level of the initial mass $m_1$ of the housing, a vibration acceleration level of the housing 120 with 1.5 $m_1$ is not reduced significantly only in a low frequency band below 160 Hz, and is reduced by about 3-4 dB in both an intermediate frequency band and a high frequency band. In other words, in the intermediate frequency band and the high frequency band, when the mass of the housing 120 is increased by 50%, the amplitude of the housing 120 is reduced by 3-4 dB.

The foregoing conclusion is a result obtained based on modeling of the speaker. Within an audibility range of a human ear, a low frequency band may be a frequency band ranging from about 20 Hz to about 150 Hz; an intermediate frequency band may be a frequency band ranging from about 150 Hz to about 5 kHz; a high frequency band may be a frequency band ranging from about 5 kHz to about 20 kHz; an intermediate-low frequency band may be a frequency band ranging from about 150 Hz to about 500 Hz; and an intermediate-high frequency band may be a frequency band ranging from about 500 Hz to about 5 kHz. A person of ordinary skill in the art may understand that distinguishing of the foregoing frequency bands is used only as an example for providing approximate intervals. Definitions of the foregoing frequency bands may change with different industries, different application scenarios, and different classification standards. For example, in some exemplary embodiments, a low frequency band may be a frequency band ranging from about 20 Hz to about 80 Hz; an intermediate-low frequency band may be a frequency band ranging from about 80 Hz to about 160 Hz; an intermediate frequency band may be a frequency band ranging from about 160 Hz to about 1280 Hz; an intermediate-high frequency band may be a frequency band ranging from about 1280 Hz to about 2560 Hz; and a high frequency band may be a frequency band ranging from about 2560 Hz to about 20 kHz.

It should be noted that although only the relationship between the sound volume generated and the mass of the housing of a bone-conduction speaker is described in the foregoing description, the first speaker 310 in the present disclosure is not limited to the bone-conduction speaker. For example, in a case of an air-conduction speaker, performance of the first speaker 310 still satisfies the foregoing analysis.

Figure 7:
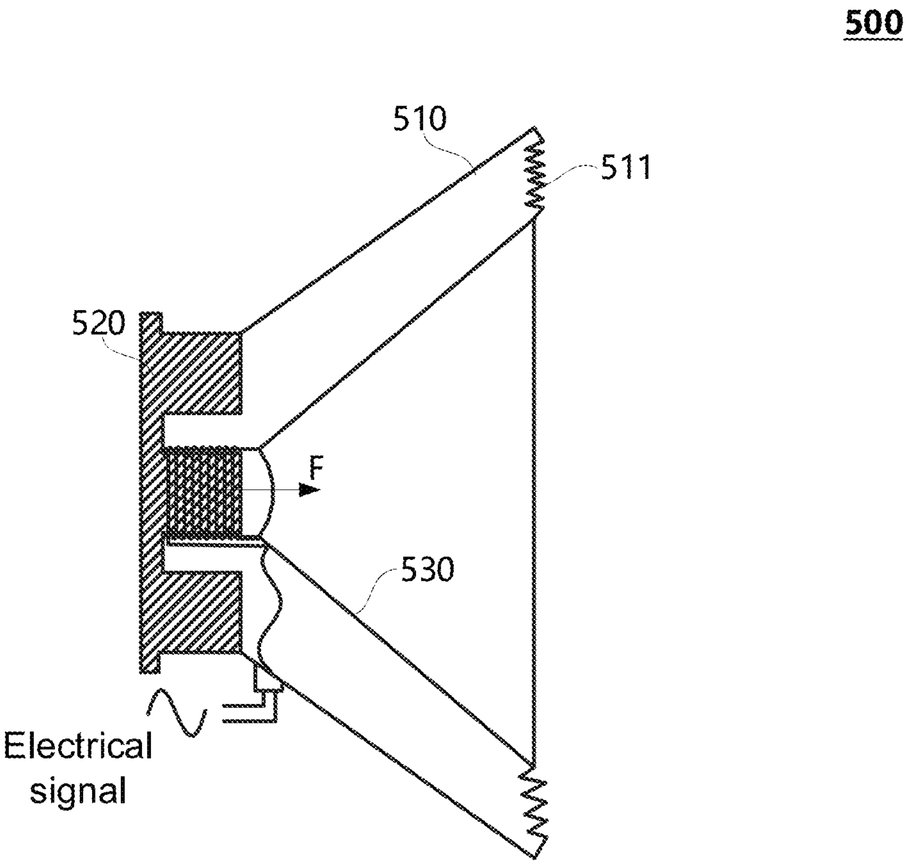
FIG. 7 is a schematic structural diagram of a moving coil speaker according to some exemplary embodiments of the present disclosure.

For example, FIG. 7 is a schematic structural diagram of a moving coil speaker 500 according to some exemplary embodiments of the present disclosure. The moving coil speaker shown in FIG. 7 may be an air-conduction speaker. Specifically, the moving coil speaker 500 may include a magnetic circuit component 520, a vibration component 530, and a support auxiliary component 510.

The support auxiliary component 510 may provide support for the vibration component 530 and the magnetic circuit component 520. The support auxiliary component 510 may include an elastic member 511. The vibration component 530 may be fixed on the support auxiliary component 510 by using the elastic member 511.

The magnetic circuit component 520 may convert an electrical signal into an excitation F. The excitation F may excite the vibration component 530.

The vibration component 530 may vibrate when excited by the excitation F and generate a sound wave.

Through dynamics analysis, similar to the bone-conduction speaker 100, an amplitude of the vibration component 530 in the moving coil speaker 500 when excited by the excitation F is related to equivalent mass m, the excitation F, damping c, and rigidity k of the vibration component 530. When other parameters remain unchanged, when the equivalent mass of the vibration component 530 increases, the amplitude decreases. When other parameters remain unchanged, when the excitation F increases, the amplitude increases. For brevity, a process of the dynamics analysis is not described again.

As may be known from above, a volume of the first sound wave 21 generated by the vibration of the first mechanical structure 311 is related to a frequency of the first electrical signal 11 and mass of the first mechanical structure 311. When the mass of the first mechanical structure 311 increases, the volume of the first sound wave 21 decreases.

Still referring to FIG. 2, the second speaker 320 may be electrically connected to the signal processing circuit 330. The second speaker 320 may receive the second electrical signal 12 from the signal processing circuit 330 and convert the second electrical signal 12 into the second sound wave 22. The second speaker 320 may be an energy conversion device. In some exemplary embodiments, the second speaker 320 may convert the received electrical signal into a mechanical vibration. Further, the second sound wave 22 may be generated by the mechanical vibration. In some exemplary embodiments, the second speaker 320 may include a second mechanical structure 321 and a second excitation device 322. A structure and function of the second mechanical structure 321 may be the same as or similar to those of the first mechanical structure 311. A structure and function of the second excitation device 322 may be the same as or similar to those of the first excitation device 312. For brevity, the structures and functions of the second mechanical structure 321 and the second excitation device 322 are not described herein again.

Same as the first speaker 310, a volume of the second sound wave 22 generated by the vibration of the second mechanical structure 321 in the second speaker 320 may be related to a frequency of the second electrical signal 21 and mass of the second mechanical structure 321. When the mass of the second mechanical structure 321 increases, the volume of the second sound wave 22 decreases.

Still referring to FIG. 1, in some exemplary embodiments, an additional device 940 may be disposed at one end of the first speaker 310. For example, the additional device 940 may include function buttons disposed on a housing on one side of the bone-conduction earphone. For example, the additional device 940 may include a headset microphone disposed on a housing on one side of the bone-conduction earphone. The headset microphone may include but is not limited to components such as a base, a microphone rod, and a microphone. The headset microphone may enhance call quality of the bone-conduction earphone. Compared with the mass of the sound output device 300, mass of the additional device 940 should not be ignored. Because the additional device 940 is disposed only on one side of the sound output device 300 (that is, the side of the first speaker 310), this may cause the mass of the first mechanical structure 311 in the first speaker 310 to be greater than mass of the second mechanical structure 321 in the second speaker 320. For example, mass of a housing of a bone-conduction speaker on one side with a headset microphone may be greater than mass of a housing of a bone-conduction speaker on the other side without a headset microphone.

As may be known from the foregoing description, if differences in damping, rigidity, and the like are not considered, given a same input electrical signal, and when the mass of the first mechanical structure 311 is greater than the mass of the second mechanical structure 321, a vibration amplitude of the first mechanical structure 311 is less than a vibration amplitude of the second mechanical structure 321. If differences in transmission media and transmission distances are not considered, volume of the first sound wave generated by the first speaker 310 and heard by a user is lower than volume of the second sound wave generated by the second speaker 320.

If a user consistently hears a difference between the volume of the first sound wave and the volume of the second sound wave (hereinafter the volume difference), the user may experience hearing impairments (for example, when a difference between sound volume heard by two ears of the user is greater than 3 dB for a long time, hearing of the user may be impaired). In addition, the volume difference between the first sound wave and the second sound wave heard by the user may also cause a shift of a sensory sound source perceived by the user comparing to an actual sensory sound source. Therefore, the volume of the first sound wave and the second sound wave needs to be adjusted, so that the volume of the first sound wave is consistent with the volume of the second sound wave as much as possible, to avoid hearing impairments and a sensory sound source shift caused by the volume difference.

Figure 8:
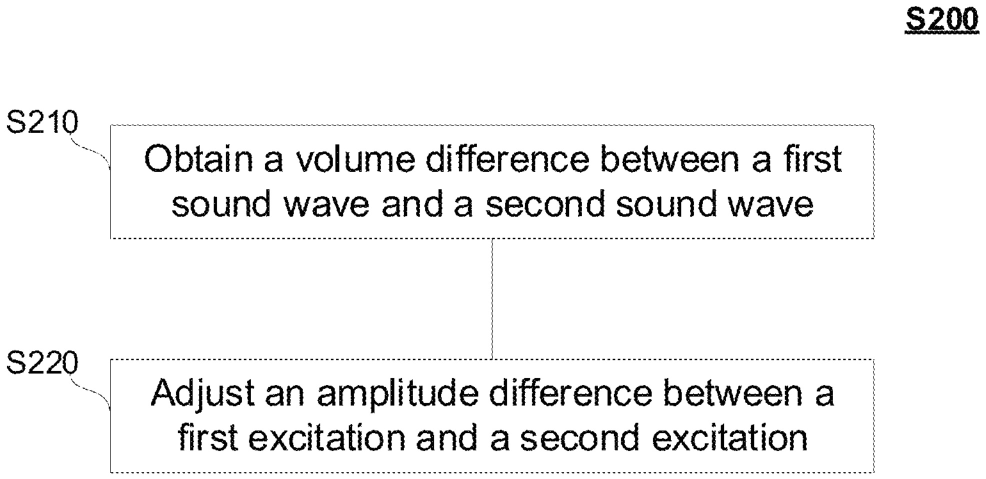
FIG. 8 is a flowchart of a volume adjustment method according to some exemplary embodiments of the present disclosure.

FIG. 8 is a flowchart of a volume adjustment method S200 according to some exemplary embodiments of the present disclosure. The method S200 may be used to adjust sound volume output by the first speaker 310 and the second speaker 320 of the sound output device 300. The method S200 may also be used to adjust a sensory sound source of the sound output device 300 perceived by the user. Specifically, the method S200 may include: S210, obtaining a volume difference between the first sound wave and the second sound wave; and S220, adjusting an amplitude difference between the first excitation and the second excitation.

S210, obtaining a volume difference between the first sound wave and the second sound wave. In some exemplary embodiments, the volume difference may be greater than 3 dB.

S220, adjusting an amplitude difference between the first excitation and the second excitation. As may be known from the foregoing description, in some exemplary embodiments, mass of the first mechanical structure is greater than mass of the second mechanical structure, thus causing the amplitude of the first mechanical structure to be less than the amplitude of the second mechanical structure, and further causing the volume of the first sound wave to be lower than the volume of the second sound wave. Therefore, the amplitude of the first mechanical structure may be adjusted by adjusting the amplitude of the first excitation; the amplitude of the second mechanical structure may be adjusted by adjusting the amplitude of the second excitation; and further, the volume difference caused by a mass difference between the first mechanical structure and the second mechanical structure may be corrected.

For ease of understanding, in the following description of the present disclosure, $F_1$ indicates a value of the first excitation; $F_2$ indicates a value of the second excitation; $M_1$ indicates mass of the first mechanical structure; $M_2$ indicates mass of the second mechanical structure; $S_1$ indicates a winding cross-sectional area of a first coil; $S_2$ indicates a winding cross-sectional area of a second coil; $\rho_1$ indicates a winding resistivity of the first coil; $\rho_2$ indicates a winding resistivity of the second coil; $B_1$ indicates a magnetic field strength of a first magnetic member; $B_2$ indicates a magnetic field strength of a second magnetic member; $R_1$ indicates a winding resistance of the first coil (hereinafter referred to as a first resistance); and $R_2$ indicates a winding resistance of the second coil (hereinafter referred to as a second resistance).

Referring to the formula (1) and the formula (6), values of the first excitation $F_1$ and/or the second excitation $F_2$ may be adjusted, so that the amplitude $X_1$ of the first mechanical structure 311 is consistent with the amplitude $X_2$ of the second mechanical structure 321, and further keeps the volume of the first sound wave 21 consistent with the volume of the second sound wave 22.

In some exemplary embodiments, the first excitation $F_1$ and the second excitation $F_2$ of different values may be obtained by adjusting a winding diameter of the first coil and/or a winding diameter of the second coil, so that the volume of the first sound wave 21 may be consistent with the volume of the second sound wave 22. Because $M_1>M_2$, the winding diameter of the first coil may be increased and/or the winding diameter of the second coil may be reduced, so that $S_1$ is greater than $S_2$. Based on the formula (1), the first excitation $F_1$ generated by the first excitation device 312 is greater than the second excitation $F_2$ generated by the second excitation device 322. With reference to the formula (6), the first excitation $F_1$ is greater than the second excitation $F_2$, so that $X_1$ may be consistent with $X_2$. In this case, power of the first sound wave 21 may be the same as power of the second sound wave 22, and the volume of the first sound wave 21 heard by the user may be the same as the volume of the second sound wave 22. In this way, the volume difference caused by the mass difference ($M_1>M_2$) between the first mechanical structure 311 and the second mechanical structure 321 may be corrected. Further, the sensory sound source shift caused by the volume difference may also be avoided.

Further, in the method of adjusting volume by adjusting a diameter of a coil, a total size of the coil remains unchanged while consistency of output volume is achieved. Therefore, structures and sizes of all components in the sound output device may remain unchanged.

For example, when the earphone requires relatively high maximum volume, the earphone may include a speaker side with an additional device and a speaker side without the additional device, and the speaker side with the additional device may include a coil with a conducting wire diameter greater than that of the speaker side without the additional device. For example, a ratio of the thicker conducting wire diameter of the coil of the speaker side with the additional device to the conducting wire diameter of the coil of the speaker side without the additional device is not less than any one of the following values or a range between any two values: 1.01, 1.02, 1.03, 1.04, 1.05, 1.06, 1.07, 1.08, 1.09, and 2.0.

For example, when the earphone requires relatively low power consumption, the speaker side without the additional device may include a coil with a conducting wire diameter less than that of the speaker side with the additional device. For example, a ratio of the thinner conducting wire diameter of the coil of the speaker side without the additional device to the conducting wire diameter of the coil of the speaker side with the additional device is not less than any one of the following values or a range between any two values: 0.90, 0.91, 0.92, 0.93, 0.94, 0.95, 0.96, 0.97, 0.98, and 0.99.

In addition, the first excitation $F_1$ and the second excitation $F_2$ of different values may be obtained by adjusting the resistivity of the first coil and/or the resistivity of the second coil, so that the volume of the first sound wave 21 may be consistent with the volume of the second sound wave 22. Because $M_1>M_2$, the resistivity $\rho_1$ of the first coil may be reduced and/or the resistivity $\rho_2$ of the second coil may be increased, so that $\rho_1$ may be less than $\rho_2$. For example, a specific winding material may be selected to enable $\rho_1$ to be less than $\rho_2$. When other independent variables are held constant, based on the formula (1), the first excitation $F_1$ generated by the first excitation device 312 is greater than the second excitation $F_2$ generated by the second excitation device 322. With reference to the formula (6), the first excitation $F_1$ may be greater than the second excitation $F_2$, so that $X_1$ may be consistent with $X_2$. In this case, power of the first sound wave 21 may be the same as power of the second sound wave 22, and the volume of the first sound wave 21 heard by the user may be the same as the volume of the second sound wave 22. In this way, the volume difference caused by the mass difference ($M_1>M_2$) between the first mechanical structure 311 and the second mechanical structure 321 may be corrected. Further, the sensory sound source shift caused by the volume difference may also be corrected.

In addition, the first excitation $F_1$ and the second excitation $F_2$ of different values may be obtained by adjusting the magnetic field strength $B_1$ of the first magnetic member and/or the magnetic field strength $B_2$ of the second magnetic member, so that the volume of the first sound wave 21 is consistent with the volume of the second sound wave 22. Because $M_1>M_2$, the magnetic field strength $B_1$ of the first magnetic member may be increased and/or the magnetic field strength $B_2$ of the second magnetic member may be reduced, so that $B_1$ is greater than $B_2$. When other independent variables are held constant, based on the formula (1), the first excitation $F_1$ generated by the first excitation device 312 is greater than the second excitation $F_2$ generated by the second excitation device 322. With reference to the formula (6), the first excitation $F_1$ is greater than the second excitation $F_2$, so that $X_1$ may be consistent with $X_2$. In this case, power of the first sound wave 21 may be the same as power of the second sound wave 22, and the volume of the first sound wave 21 heard by the user may be the same as the volume of the second sound wave 22. In this way, the volume difference caused by the mass difference ($M_1>M_2$) between the first mechanical structure 311 and the second mechanical structure 321 may be corrected. Further, the sensory sound source offset caused by the volume difference may also be corrected.

In addition, a size of the first magnetic member may be increased and/or a size of the second magnetic member may be reduced, so that $B_1$ may be greater than $B_2$.

For example, magnetic members made of materials with different magnetic field strengths may be selected, so that $B_1$ may be greater than $B_2$. For example, a material with stronger magnetic field strength may be selected for the first magnetic member, and a material of weaker magnetic field strength may be selected for the second magnetic member. In some exemplary embodiments, remanence of the first magnetic member may be greater than remanence of the second magnetic member, so that the magnetic field strength $B_1$ generated by the first electromagnetic excitation device may be greater than the magnetic field strength $B_2$ generated by the second electromagnetic excitation device. In some exemplary embodiments, a coercive force of the first magnetic member may be greater than a coercive force of the second magnetic member, so that the magnetic field strength $B_1$ generated by the first electromagnetic excitation device may be greater than the magnetic field strength $B_2$ generated by the second electromagnetic excitation device. In some exemplary embodiments, a magnetic energy product of the first magnetic member may be greater than a magnetic energy product of the second magnetic member, so that the magnetic field strength $B_1$ generated by the first electromagnetic excitation device may be greater than the magnetic field strength $B_2$ generated by the second electromagnetic excitation device.

In some exemplary embodiments, the first excitation $F_1$ and the second excitation $F_2$ may be adjusted by adjusting a value of the first resistance $R_1$ and/or a value of the second resistance $R_2$, so that the volume of the first sound wave 21 may be consistent with the volume of the second sound wave 22. In the present disclosure, the first resistance $R_1$ is a total resistance of the first speaker, including an internal resistance of the first speaker and a possible additional resistance; and the second resistance $R_2$ is a total resistance of the second speaker, including an internal resistance of the second speaker and a possible additional resistance. Because $M_1>M_2$, the first resistance $R_1$ may be reduced and/or the second resistance $R_2$ may be increased, so that $R_1$ is less than $R_2$. When other independent variables are held constant, based on the formula (1), the first excitation $F_1$ generated by the first excitation device 312 is greater than the second excitation $F_2$ generated by the second excitation device 322. With reference to the formula (6), the first excitation $F_1$ is greater than the second excitation $F_2$, so that $X_1$ may be consistent with $X_2$. In this case, power of the first sound wave 21 may be the same as power of the second sound wave 22, and the volume of the first sound wave 21 heard by the user may be the same as the volume of the second sound wave 22. In this way, the volume difference caused by the mass difference ($M_1>M_2$) between the first mechanical structure 311 and the second mechanical structure 321 may be corrected. For example, when the earphone has no special requirement on maximum volume and power consumption, a bone-conduction speaker on one side without an additional device (for example, a headset microphone) may be connected to one resistor in series. For example, a resistance value of the resistor connected in series to the bone-conduction speaker on the side without an additional device is not less than 1Ω. It should be noted that the resistor connected in series may be a separate resistor, or a same effect may also be achieved by controlling a resistance of a wire (such as a rear-hung conducting wire) used in a circuit.

In addition, a resistor may be connected in series outside the second coil, so that the first resistance $R_1$ may be less than the second resistance $R_2$ (that is, $R_1<R_2$), to further correct the volume difference caused by the mass difference between the first mechanical structure 311 and the second mechanical structure 321. Further, by externally connecting a resistor in series, no changes need to be incorporated into manufacturing and design processes, and there is little impact on the manufacturing and design.

In addition, the resistance $R_1$ of the first coil may be directly reduced and/or the resistance $R_2$ of the second coil may be directly increased, so that the first resistance $R_1$ may be less than the second resistance $R_2$ (that is, $R_1<R_2$), to further correct the volume difference caused by the mass difference between the first mechanical structure 311 and the second mechanical structure 321. Based on a formula $$R = \frac{\rho L}{S},$$

in some exemplary embodiments, the resistivity of the first coil may be reduced and/or the resistivity of the second coil may be increased, so that the resistivity of the first coil may be less than the resistivity of the second coil. In some exemplary embodiments, a winding length of the first coil may be increased and/or a winding length of the second coil may be reduced, so that the resistance of the first coil may be less than the resistance of the second coil. In some exemplary embodiments, the winding diameter of the first coil may be reduced and/or the winding diameter of the second coil may be increased, so that the resistance of the first coil may be less than the resistance of the second coil. It should be noted that when the resistivity, the winding length, and/or the winding diameter of the first coil and/or the second coil are/is increased and/or reduced, mass of the first coil and/or the second coil may also change. However, the mass of the first coil and the mass of the second coil also affect vibrations of the first mechanical structure and the second mechanical structure. Therefore, when parameters such as the resistivity, the winding length, and/or the winding diameter are adjusted, impact of other parameters also needs to be considered, so that the amplitude of the first mechanical structure 311 may be consistent with the amplitude of the second mechanical structure 321.

Referring to the formula (6), in some exemplary embodiments, different amplitudes of the first excitation $F_1$ and the second excitation $F_2$ may also be obtained by adjusting the amplitude of the first electrical signal 11 and/or the amplitude of the second electrical signal 12, so that the volume of the first sound wave 21 may be consistent with the volume of the second sound wave 22.

For example, because $M_1>M_2$, a power amplification circuit may be disposed in the signal processing circuit 330. For example, the power adjustment circuit 335 may be the power amplification circuit. The power amplification circuit may amplify the first electrical signal 11, so that power of the first electrical signal 11 may be higher than power of the second electrical signal 12. Therefore, assuming that amplitudes of the first electrical signal 11 and the second electrical signal 12 before passing through the power adjustment circuit 335 are the same, the amplitude of the first electrical signal 11 after passing through the power adjustment circuit 335 may be greater than the amplitude of the second electrical signal 12. Thus, the first speaker 310 may receive the amplified first electrical signal. Therefore, the first excitation $F_1$ generated by the first speaker 310 may be greater than the second excitation $F_2$ generated by the second speaker 320 (that is, $F_1>F_2$).

For example, because $M_1>M_2$, a power attenuation circuit may be disposed in the signal processing circuit 330. For example, the power adjustment circuit 335 may be the power attenuation circuit. The power attenuation circuit may attenuate the second electrical signal 12. Therefore, the amplitude of the first electrical signal 11 may be greater than the amplitude of the second electrical signal 12. The second speaker 320 may receive the attenuated second electrical signal 12. Therefore, assuming that amplitudes of the first electrical signal 11 and the second electrical signal 12 before passing through the power adjustment circuit 335 are the same, the second excitation $F_2$ generated by the second speaker 320 based on the attenuated second electrical signal 12 after passing through the power adjustment circuit 335 may be less than the first excitation $F_1$ (that is, $F_1>F_2$). When other independent variables are held constant, with reference to the formula (6), the first excitation $F_1$ may be greater than the second excitation $F_2$, so that $X_1$ may be consistent with $X_2$. In this case, power of the first sound wave 21 may be the same as power of the second sound wave 22, and the volume of the first sound wave 21 heard by the user may be the same as the volume of the second sound wave 22. In this way, the volume difference caused by the mass difference ($M_1>M_2$) between the first mechanical structure 311 and the second mechanical structure 321 may be corrected. For example, chip control software in the bone-conduction earphone may also be used to adjust gains of audio signals of bone-conduction speakers on two sides of the bone-conduction earphone, so that volume on the two sides of the bone-conduction earphone may be consistent.

In addition, in some exemplary embodiments, mass of the first mechanical structure 311 and/or the second mechanical structure 321 may be directly adjusted, so that the mass of the first mechanical structure 311 may be consistent with the mass of the second mechanical structure 321, to correct a volume difference between the first sound wave 21 and the second sound wave 22 caused by a mass difference. For example, a headset microphone, function buttons, and the like may be disposed on one side of the first speaker 310, so that the mass of the first mechanical structure 311 may be greater than the mass of the second mechanical structure 321. A bobweight may be added to the side of the second speaker 320, so that the mass of the second mechanical structure 321 may be increased to be the same as the mass of the first mechanical structure 311. Therefore, the mass of the first mechanical structure 311 is the same as the mass of the second mechanical structure 321. Thus, the volume of the first sound wave 21 may be the same as the volume of the second sound wave 22.

It should be noted that the volume and power mentioned in the foregoing volume adjustment solutions and/or exemplary embodiments are for volume and power of sound generated by the speakers in the earphone, rather than power consumed by the earphone. The foregoing volume adjustment solutions and/or exemplary embodiments are not isolated. The foregoing volume adjustment solutions and/or exemplary embodiments may be used separately to adjust volume of two ends of the sound output device 300. The foregoing volume adjustment solutions and/or exemplary embodiments may also be used in combination and cooperation to adjust volume of two ends of the sound output device 300. For example, a mass adjustment and an excitation adjustment may be performed simultaneously. For example, when $M_1>M_2$, a method combining solutions such as "increasing the mass of the second mechanical structure 311", "increasing the first excitation", and "increasing the diameter of the first coil" may be used, so that the volume of the first speaker 310 may be consistent with the volume of the second speaker 320.

The manufactured products of the foregoing solutions and/or exemplary embodiments have beneficial technical effects. For example, the following table lists test results of three earphone samples. Sample 1: a bone-conduction speaker on one side with low volume includes a coil with a larger conducting wire diameter, and a bone-conduction speaker on the other side includes a normal coil. Sample 2: a bone-conduction speaker on one side with high volume includes a coil with a smaller conducting wire diameter, and a bone-conduction speaker on the other side includes a normal coil. Sample 3: a bone-conduction speaker on one side with high volume is connected in series to a resistor having a predetermined resistance value. For all three samples, a same functional module is added to the bone-conduction speaker on one side, and no functional module is disposed on the other side. A mobile phone is used to play a white noise signal, and an earphone sample to be tested is connected by Bluetooth. A total current at a battery end of each earphone with same volume is tested. The test results are shown in Table 1. In a test process, an output voltage of the battery end does not change (4.0-4.2 V).

TABLE 1

Total currents at battery ends of earphone samples with same volume

| | Volume/dB | | | | | | |
|---|---|---|---|---|---|---|---|
| Sample | 85 | 82 | 79 | 76 | 73 | 70 | 67 |
| Sample 1 | 80 | 48 | 30 | 20 | 12.6 | 5.1 | 3.5 |
| Sample 2 | 72 | 45 | 28 | 18 | 11.7 | 7.8 | 4 |
| Sample 3 | 75 | 48 | 29 | 19 | 12.5 | 8.3 | 4 |
| Normal earphone | 52 | 32 | 21 | 13 | 9 | 4.3 | 3.4 |

As may be seen from the test results in Table 1, with the same volume, the total currents at the battery ends of the three earphone samples (sample 1, sample 2, and sample 3) having additional functional modules are increased in comparison with the normal earphone without additional functional modules. In the three samples, a total current of the sample 2 (the speaker on one side with high volume uses a coil with a smaller conducting wire diameter, and the speaker on the other side uses a normal coil) is the smallest; and a total current of the sample 1 (the speaker on one side with low volume uses a coil with a larger conducting wire diameter, and the speaker on the other side uses a normal coil) is the largest. In the sample 3 (the bone-conduction speaker on one side with high volume is connected in series to a resistor having a predetermined resistance value), only a resistor needs to be connected in series to a circuit board or another manner may be used to achieve an effect of connecting a resistor in series. No material needs to be added in manufacturing and design processes, and there is little impact on the manufacturing and design.

In addition, the battery lives of different samples are tested. In a test with same volume (85 dB), a mobile phone is used to play a white noise signal, and an earphone sample to be tested is connected by Bluetooth. Different earphone samples use batteries of a same capacity, and all the batteries are in a fully charged state when the test starts. Actual usage time of different samples is shown in Table 2.

TABLE 2

Battery life of earphone samples

| | Start Time | End time | Duration |
|---|---|---|---|
| Sample 1 | 9:58 | 12:02 | 2:04 |
| Sample 2 | 13:47 | 16:05 | 2:18 |
| Sample 3 | 17:47 | 20:10 | 2:23 |
| Normal earphone | 16:14 | 19:07 | 2:53 |

As may be seen from the test results in Table 2, with same volume, battery lives of all the three samples are clearly reduced in comparison with the normal sample. Battery life of the sample 1 is the shortest, and battery life of the sample 3 is slightly shorter than that of the sample 2, but a difference is not significant. The foregoing results match the foregoing battery current test results.

As may be known from the foregoing description, if volume of the first sound wave 21 heard by the user is lower than volume of the second sound wave 22 heard by the user, adjusting an earphone structural design may compensate for a volume difference between two speakers. In addition, for the volume difference between the speakers, a sensory sound source formed by a speaker may also be adjusted.

The sensory sound source is a sound generation location point in a sound field, that is, the sensory sound source is a location of sound. The brain of the user determines that a sound generation location (that is, a sensory sound source perceived by the user) of target sound information leans to a side of the second sound wave 22 with higher volume, that is, a side of the second speaker 320. However, a distance between the first speaker 310 and the user and a distance between the second speaker 320 and the user are approximately the same. In other words, an actual sensory sound source of the target sound information 10 is in the center (that is, coming from a directly front direction or directly rear direction of the user). In other words, a shift occurs between the sensory sound source perceived by the user and an actual sensory sound source. In some exemplary embodiments, the present disclosure provides a sensory sound source adjustment method, which may enable the sensory sound source perceived by the user to be as close as possible to the actual sensory sound source, so that the shift between the sensory sound source perceived by the user and the actual sensory sound source is reduced. The sensory sound source adjustment method may be independently applied to the earphone described in the present disclosure, and may also be combined with the foregoing volume compensation solution and/or exemplary embodiment.

Figure 9:
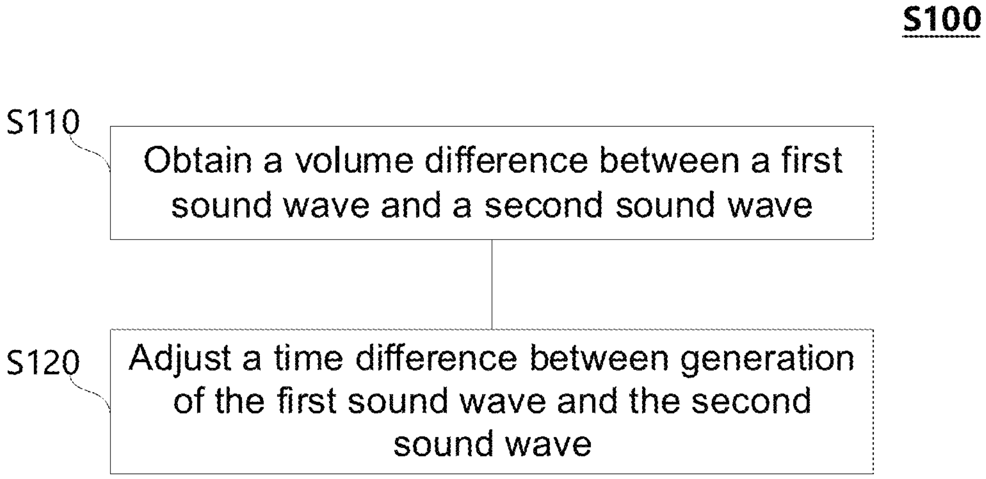
FIG. 9 is a flowchart of a sensory sound source adjustment method according to some exemplary embodiments of the present disclosure.

FIG. 9 is a flowchart of a sensory sound source adjustment method S100 according to some exemplary embodiments of the present disclosure. The method S100 may be used to adjust sensory sound sources output by the first speaker 310 and the second speaker 320 of the sound output device 300. Specifically, the method S100 may include: S110, obtaining a volume difference between the first sound wave and the second sound wave; and S120, adjusting a time difference between generation of the first sound wave and the second sound wave.

A "binaural effect" is an effect in which people determine a location of sound depending on a volume difference, a time difference, a phase difference, and a tone difference between two ears. Because there is a distance between a left ear and a right ear, same sound coming from other directions than a directly front direction and a directly rear direction arrives at the two ears at different times with different volume, phases, and tones, resulting in a volume difference, a time difference, a phase difference, and a tone difference. For example, if a sound source leans to the right, the sound will arrive at the right ear first and then arrives at the left ear later. If the sound leans more to one side, a time difference will increase correspondingly. For example, if the sound source leans to the right, a distance from the sound source to the right ear is shorter than a distance from the sound source to the left ear, and the sound volume arriving at the right ear is higher than the sound volume arriving at the left ear. If the sound leans to one side more, a volume difference will increase accordingly. For example, the sound is propagated in a form of a wave, but phases of the sound wave in different spatial positions are different. Due to a spatial distance between the two ears, phases of the sound wave arriving at the two ears may be different. A myringa in an eardrum vibrates with the sound wave. A phase difference of the vibration becomes a factor for determining the location of the sound source by the brain.

Human brain may determine locations of sound sources (that is, sensory sound sources) depending on the “binaural effect”.

If a left ear hears sound first, the brain of a listener perceives that the sound comes from the left (a side first hearing the sound), that is, a sensory sound source perceived by the brain of the listener leans to a left side, or vice versa. The phenomenon is referred to as a “time difference effect” between left and right ears.

If the sound volume heard by the left ear is higher than the sound volume heard by the right ear, the brain of the listener considers that the sound comes from a left direction, or vice versa. The phenomenon is referred to as a “volume difference effect” between left and right ears. The foregoing sensory sound source shift caused by the mass difference between the first mechanical structure and the second mechanical structure may also be understood as a “volume difference effect” essentially.

Therefore, the shift of the sensory sound source perceived by the user, which is caused by the “volume difference”, may be adjusted by using the “time difference” and/or “phase difference”.

S110, obtaining a volume difference between the first sound wave and the second sound wave. First, the volume difference between the first sound wave 21 and the second sound wave 22 may be obtained. A value of the sensory sound source shift caused by the volume difference may be obtained based on the volume difference. For example, if the volume of the first sound wave 21 is lower than that of the second sound wave 22 by β, the sensory sound source perceived by the user may shift from a center position to a direction of the second speaker 320 by δ.

S120, adjusting a sound generation time difference between the first sound wave and the second sound wave.

In some exemplary embodiments, the shift of the sensory sound source perceived by the user, which is caused by the mass difference between the first mechanical structure 311 and the second mechanical structure, may be adjusted by adjusting the sound generation time difference between the first sound wave 21 and the second sound wave 22.

For example, the volume of the first sound wave 21 is lower than that of the second sound wave 22. A first duration $t_1$ is required for the sound output device 300 to convert the target sound information 10 into the first sound wave 21 and a second duration $t_2$ is required for the sound output device 300 to convert the target sound information 10 into the second sound wave 22; and the first duration $t_1$ is shorter than the second duration $t_2$. Therefore, a moment when the first speaker 310 generates a sound is earlier than a moment when the second speaker 320 generates a sound. In some exemplary embodiments, the time of sound generation by the first speaker 310 may be earlier than the time of sound generation by the second speaker 320 by one time difference. In some exemplary embodiments, the time difference is not greater than 3 ms. Specifically, the time difference may be any one of the following values or any value between any two of the following values: 0.1 ms, 0.2 ms, 0.3 ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2.0 ms, 2.1 ms, 2.2 ms, 2.3 ms, 2.4 ms, 2.5 ms, 2.6 ms, 2.7 ms, 2.8 ms, 2.9 ms, and 3.0 ms. Assuming that all information other than the time of sound generation is the same for the first sound wave 21 and the second sound wave 22. When transmission media and transmission distances are the same, a moment of hearing the first sound wave 21 by the left ear of the user is earlier than a moment of hearing the second sound wave 22 by the right ear of the user. Based on the binaural effect, the brain of the user may determine that a source location of the target sound information 10 leans to one side of the first sound wave 21 whose sound is generated earlier, that is, a left side of the user. Therefore, considering a right shift of the sensory sound source because the volume of the first sound wave 21 is lower than the volume of the second sound wave 22, finally, the source location (that is, the sensory sound source perceived by the user) of the target sound information 10 heard by the user may also be adjusted to the center position. This resolves the right shift of the sensory sound source due to the mass of the first mechanical structure 311 being greater than the mass of the second mechanical structure 321.

In some exemplary embodiments, a sensory sound source location of the earphone may be adjusted by controlling a time difference between audio signals (that is, a time difference between the audio signals on a left sound channel and a right sound channel) of the speakers on the two sides. For example, the sensory sound source location of the earphone may be adjusted by controlling a time difference between sound waves output by the speakers on the two sides. For example, the first sound wave output by the first speaker may be generated earlier than the second sound wave output generated by the second speaker. In some exemplary embodiments, the first sound wave may be generated earlier than the second sound wave by one time difference. In some exemplary embodiments, the time difference is not greater than 3 ms. Specifically, the time difference may be any one of the following values or any value between any two of the following values: 0.1 ms, 0.2 ms, 0.3 ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2.0 ms, 2.1 ms, 2.2 ms, 2.3 ms, 2.4 ms, 2.5 ms, 2.6 ms, 2.7 ms, 2.8 ms, 2.9 ms, and 3.0 ms. For example, the time difference may be 1.0 ms, or a value slightly greater than 1.0 ms.

In some exemplary embodiments, a sensory sound source location of the earphone may be adjusted by controlling a time difference between audio signals (that is, a time difference between the first electrical signal and the second electrical signal) input to the speakers on the two sides. For example, by using the signal processing circuit, the first electrical signal input to the first speaker may be earlier than the second electrical signal input to the second speaker. In some exemplary embodiments, the first electrical signal is input into the signal processing circuit earlier than the second electrical signal by one time difference. In some exemplary embodiments, the time difference is not greater than 3 ms. Specifically, the time difference may be any one of the following values or any value between any two of the following values: 0.1 ms, 0.2 ms, 0.3 ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2.0 ms, 2.1 ms, 2.2 ms, 2.3 ms, 2.4 ms, 2.5 ms, 2.6 ms, 2.7 ms, 2.8 ms, 2.9 ms, and 3.0 ms. For example, the time difference may be 1.0 ms, or a value slightly greater than 1.0 ms.

In addition, after obtaining an shift value $\delta$ of the sensory sound source perceived by the user. The sensory sound source perceived by the user may be further adjusted by adjusting the phase difference between the first sound wave 21 and the second sound wave 22, so as to center the sensory sound source perceived by the user. For example, assuming that the sensory sound source is shifted to a direction of the first sound wave 21 by $\delta$ only when a phase of the first sound wave 21 is greater than a phase of the second sound wave 22 by $\delta_{w2}$.

To make the phase of the first sound wave 21 greater than the phase of the second sound wave 22 by $\delta_{w2}$, a phase delay circuit may be disposed in at least one of the signal processing circuit 330, the first speaker 310, or the second speaker 320.

For example, a phase delay circuit may be disposed in the second speaker 320, so that the phase of the first sound wave 21 may be greater than the phase of the second sound wave 22 by $\delta_{w2}$. For example, the signal processing circuit 330 may process the target sound information 10, so that a phase of the generated first electrical signal 11 may be the same as a phase of the second electrical signal 12. A phase delay circuit may be disposed in the second speaker 320. The second speaker 320 may delay the phase of the second electrical signal 12 by $\delta_{w2}$, and generate the second sound wave 22 with a phase also delayed by $\delta_{w2}$. That is, the phase of the final first sound wave 21 is greater than the phase of the final second sound wave 22 by $\delta_{w2}$. Based on the binaural effect, the sensory sound source perceived by the user may be shifted to the direction of the first sound wave 21 with a larger phase. This may offset the sensory sound source shift to the direction of the second sound wave 22 due to the mass $m_1$ of the first mechanical structure 311 being greater than the mass $m_2$ of the second mechanical structure 321. Finally, the sensory sound source perceived by the user may be centered.

For example, a phase delay circuit may be disposed in the signal processing circuit 330, so that the phase of the first sound wave 21 may be greater than the phase of the second sound wave 22 by $\delta_{w2}$. For example, the signal processing circuit 330 may process the target sound information 10 to obtain the first electrical signal 11 and the second electrical signal 12. The phase of the first electrical signal 11 may be greater than the phase of the second electrical signal 12 by $\delta_{w1}$. $\delta_{w1}=\delta_{w2}$. The first speaker 310 and the second speaker 320 may perform same phase processing on the phases of the first electrical signal 11 and the second electrical signal 12 respectively (for example, the first speaker 310 does not perform processing on the phase of the first electrical signal 11, and the second speaker 320 does not perform processing on the phase of the second electrical signal 12). Therefore, the phase of the final first sound wave 21 generated by the first speaker 310 may be greater than the phase of the final second sound wave 22 generated by the second speaker 320 by $\delta_{w2}$. Based on the binaural effect, the sensory sound source perceived by the user may be shifted to the direction of the first sound wave 21 with a larger phase. This may offset the sensory sound source shift to the direction of the second sound wave 22 due to the mass $m_1$ of the first mechanical structure 311 being greater than the mass $m_2$ of the second mechanical structure 321. Finally, the sensory sound source perceived by the user may be centered.

In some exemplary embodiments, the volume difference between the first sound wave and the second sound wave is not greater than 3 dB. Therefore, the shift of the sensory sound source perceived by the user, which is caused by the "volume difference", may be adjusted by using the "time difference" and/or the "phase difference". On one hand, the sensory sound source perceived by the user may be adjusted, and on the other hand, the user may experience no hearing impairments. This is because only the sensory sound source perceived by the user is adjusted by adjusting the phase difference or the time difference to center the sensory sound source, but volume of the first sound wave and the second sound wave actually heard by the left ear and the right ear is not changed. If there is a great volume difference between sound waves heard by the left ear and right ear, long-term use of the earphone may cause hearing impairments to the listener.

As described above, in some exemplary embodiments, the present disclosure provides a sensory sound source adjustment method S100 and a volume adjustment method S200. The sensory sound source adjustment method S100 in the present disclosure may include: S110, obtaining a volume difference between the first sound wave and the second sound wave; and S120, adjusting a sound generation time difference between the first sound wave and the second sound wave. The volume adjustment method S200 in the present disclosure may include: S210, obtaining a volume difference between the first sound wave and the second sound wave; and S220, adjusting an amplitude difference between the first excitation and the second excitation. In the sensory sound source adjustment method S100 of the present disclosure, the shift of the sensory sound source perceived by the user, which is caused by the mass difference between the first mechanical structure and the second mechanical structure, may be corrected by setting the time difference between the first sound wave and the second sound wave. In the volume adjustment method S200 of the present disclosure, the volume difference between the first speaker and the second speaker, which is caused by the mass difference between the first mechanical structure and the second mechanical structure, may be corrected by setting different coil resistivities, coil winding diameters, magnetic field strengths, and/or resistances.

As may be known from the foregoing description, when differences of transmission media and transmission distances are not considered, volume of a sound wave generated by a speaker is in positive correlation with an amplitude of a mechanical structure in the speaker. If the amplitude of the mechanical structure increases, volume of the sound wave also increases. The amplitude of the mechanical structure is in positive correlation with an excitation received by the mechanical structure. For a same mechanical structure, if an excitation received by the mechanical structure increases, an amplitude of the mechanical structure also increases.

In some exemplary embodiments, given a same excitation, volume of the first sound wave generated by the first mechanical structure in the sound output device may be different from volume of the second sound wave generated by the second mechanical structure. For example, in the sound output device 300 shown in FIG. 1, the additional device 940 may increase the mass of the first mechanical structure 311 such that the mass of the first mechanical structure 311 is greater than the mass of the second mechanical structure 321 (that is, $M_1>M_2$). Referring to the formula (6), given the same excitation f, the amplitude of the first mechanical structure is less than the amplitude of the second mechanical structure. Without considering differences of transmission media and transmission distances, the volume of the first sound wave perceived by the user may be lower than the volume of the second sound wave. Certainly, in some exemplary embodiments, other reasons may also cause a volume difference between sound waves output at two ends of the sound output device. For example, without a headset microphone, a mass difference between the two ends of the earphones may be caused by various reasons such as water in one end of the earphone, thereby resulting in a volume difference between sound generated at the two ends of the earphone. For ease of understanding, a bone-conduction speaker is used as a non-limiting example in the following description.

In real life, to not affect user experience, sound volume heard by the two ears of the user needs to be as consistent as possible. As may be known from the foregoing description, volume of a sound wave generated by a speaker in the sound output device may be related to an excitation generated based on an electrical signal, mass M of a mechanical structure generating a vibration, damping C of a vibrating system, rigidity K, and the like.

Using the bone-conduction speaker 100 as a non-limiting example, based on the formula (6), volume of a sound wave generated by the bone-conduction speaker 100 may be affected by all the following parameters: a frequency of the excitation f (its value is equal to 1/ω), an amplitude $F_0$ of the excitation f, the mass $m_1$ of the housing 120, the mass $m_2$ of the magnetic circuit 130, rigidity $k_1$ and damping $c_1$ of the vibrating piece 140, and rigidity $k_2$ and damping $c_2$ of the ear mount 110. For example, when other parameters remain unchanged, the amplitude $F_0$ of the excitation f is proportional to the amplitude $X_1$ of the housing 120. When the amplitude $F_0$ of the excitation f increases, the amplitude $X_1$ of the housing 120 also increases. For another example, when other parameters remain unchanged, when the mass $m_1$ of the housing 120 of the bone-conduction speaker 100 increases, the amplitude $X_1$ of the housing 120 decreases. Therefore, when the foregoing parameters change, the amplitude $X_1$ of the housing 120 also changes accordingly. Without considering differences of transmission media and transmission distances, the amplitude $X_1$ of the housing 120 is proportional to volume of the sound wave generated by the vibration of the housing 120. When the amplitude $X_1$ increases, the volume of the sound wave also increases; or if the amplitude $X_1$ decreases, the volume of the sound wave also decreases.

Therefore, when the excitation F and the mass M of the mechanical structure are balanced properly, a desired amplitude X may be obtained. Even if there is a mass difference between the mechanical structures at the two ends of the sound output device (for example, a headset microphone is disposed only on one side of a bone-conduction earphone), volume output from the two ends of the sound output device may be consistent.

Therefore, in some exemplary embodiments, the present disclosure further provides a sound output device. The sound output device may include but is not limited to an earphone, a hearing aid, a helmet, or the like, or any combination thereof. The earphone may include but is not limited to a wired earphone, a wireless earphone, a Bluetooth earphone, or the like, or any combination thereof. Specifically, the sound output device may include a first speaker, a second speaker, and a signal processing circuit.

The signal processing circuit may receive target sound information, process the target sound information, and generate a first electrical signal and a second electrical signal.

The first speaker may be electrically connected to the signal processing circuit. The first speaker may receive the first electrical signal from the signal processing circuit and convert the first electrical signal into a first sound wave. In some exemplary embodiments, the first speaker may include a first bone-conduction speaker, and the first sound wave may include a first bone-conducted sound wave. In some exemplary embodiments, the first speaker may convert the received first electrical signal into a mechanical vibration. Further, the first sound wave may be generated by the mechanical vibration. In some exemplary embodiments, the first speaker may include a first mechanical structure and a first excitation device. The first excitation device may generate a first excitation based on the first electrical signal. The first excitation, as an external force, may excite the first mechanical structure to vibrate. Further, the first mechanical structure may vibrate to generate the first sound wave.

The second speaker may be electrically connected to the signal processing circuit. The second speaker may receive the second electrical signal from the signal processing circuit and convert the second electrical signal into a second sound wave. In some exemplary embodiments, the second speaker may include a second bone-conduction speaker, and the second sound wave may include a second bone-conducted sound wave. In some exemplary embodiments, the second speaker may convert the received second electrical signal into a mechanical vibration. Further, the second sound wave may be generated by the mechanical vibration. In some exemplary embodiments, the second speaker may include a second mechanical structure and a second excitation device. The second excitation device may generate a second excitation based on the second electrical signal. The second excitation, as an external force, may excite the second mechanical structure to vibrate. Further, the second mechanical structure may vibrate to generate the second sound wave.

In some exemplary embodiments, the first excitation device and the second excitation device may be electromagnetic excitation devices. A value of the first excitation and a value of the second excitation may be obtained through calculation based on the formula (1). A vibration process of the first mechanical structure and the second mechanical structure may be expressed by the formula (6).

For ease of description, in the following description of the present disclosure, $F_1$ indicates the value of the first excitation, $F_2$ indicates the value of the second excitation, $M_1$ indicates mass of the first mechanical structure, $M_2$ indicates mass of the second mechanical structure, $S_1$ indicates a winding cross-sectional area of a first coil, $S_2$ indicates a winding cross-sectional area of a second coil, $\rho_1$ indicates a winding resistivity of the first coil, $\rho_2$ indicates a winding resistivity of the second coil, $B_1$ indicates a magnetic field strength of a first magnetic member, $B_2$ indicates a magnetic field strength of a second magnetic member, $R_1$ indicates a winding resistance of the first coil (hereinafter referred to as a first resistance), $R_2$ indicates a winding resistance of the second coil (hereinafter referred to as a second resistance), $X_1$ indicates an amplitude of the first mechanical structure, and $X_2$ indicates an amplitude of the second mechanical structure.

Given a same excitation, in some exemplary embodiments, sound volume generated by the first mechanical structure may be lower than sound volume generated by the second mechanical structure. For example, in some exemplary embodiments, mass $M_1$ of the first mechanical structure may be greater than mass $M_2$ of the second mechanical structure, and consequently, given a same excitation, volume of the first sound wave generated by the first mechanical structure may be lower than volume of the second sound wave generated by the second mechanical structure. Referring to the formula (1) and the formula (6), assuming that the first electrical signal and the second electrical signal are the same ($U_1=U_2$), and that the first excitation device and the second excitation device are the same (that is, $B_1=B_2$, $S_1=S_2$, $\rho_1=\rho_2$, and $R_1=R_2$), without considering damping and rigidity differences (that is, $C_1=C_2$, and $K_1=K_2$), it may be concluded based on the formula (1) and the formula (6) that the first excitation $F_1$ and the second excitation $F_2$ are the same ($F_1=F_2$). Based on the foregoing assumption, because $M_1>M_2$, as may be known from a relationship between mass and an amplitude, the amplitude of the first mechanical structure is less than the amplitude of the second mechanical structure. When transmission media and transmission distances are the same, volume of the sound wave generated by the first speaker and heard by a user is lower than volume of the sound wave generated by the second speaker. Volume of the first sound wave is the same as volume of the second sound wave.

For ease of description, for example, a left ear of the user hears the first sound wave, and a right ear of the user hears the second sound wave. In general, the volume of the first sound wave heard by the left ear of the user should be the same as the volume of the second sound wave heard by the right ear of the user, to avoid hearing impairments caused by a volume difference. In other words, when transmission distances and transmission media are the same, it is expected that the amplitude of the first mechanical structure to be as consistent as possible with the amplitude of the second mechanical structure.

In some exemplary embodiments, a winding diameter of the first coil may be greater than a winding diameter of the second coil, that is, $S_1>S_2$. Based on the formula (1) and the formula (6), the first excitation $F_1$ generated by the first excitation device may be greater than the second excitation $F_2$ generated by the second excitation device, so that $X_1$ may be consistent with $X_2$. In this case, power of the first sound wave is the same as power of the second sound wave, and the volume of the first sound wave heard by the user is the same as the volume of the second sound wave. In this way, the volume difference caused by a mass difference between the first mechanical structure and the second mechanical structure may be corrected.

In some exemplary embodiments, the resistivity of the first coil may be less than the resistivity of the second coil, that is, $\rho_1<\rho_2$. Based on the formula (1) and the formula (6), the first excitation $F_1$ generated by the first excitation device is greater than the second excitation $F_2$ generated by the second excitation device, so that $X_1$ may be consistent with $X_2$. In this case, power of the first sound wave is the same as power of the second sound wave, and the volume of the first sound wave heard by the user is the same as the volume of the second sound wave. In this way, the volume difference caused by the mass difference between the first mechanical structure and the second mechanical structure may be corrected.

In some exemplary embodiments, given a same input current, the magnetic field strength $B_1$ generated by the first electromagnetic excitation device may be greater than the magnetic field strength $B_2$ generated by the second electromagnetic excitation device. Based on the formula (1) and the formula (6), the first excitation $F_1$ generated by the first excitation device may be greater than the second excitation $F_2$ generated by the second excitation device, so that $X_1$ may be consistent with $X_2$. In this case, power of the first sound wave may be the same as power of the second sound wave, and the volume of the first sound wave heard by the user may be the same as the volume of the second sound wave. In this way, the volume difference caused by the mass difference between the first mechanical structure and the second mechanical structure may be corrected. In some exemplary embodiments, remanence of the first magnetic member may be greater than remanence of the second magnetic member, so that the magnetic field strength $B_1$ generated by the first electromagnetic excitation device may be greater than the magnetic field strength $B_2$ generated by the second electromagnetic excitation device. In some exemplary embodiments, a coercive force of the first magnetic member may be greater than a coercive force of the second magnetic member, so that the magnetic field strength $B_1$ generated by the first electromagnetic excitation device may be greater than the magnetic field strength $B_2$ generated by the second electromagnetic excitation device. In some exemplary embodiments, a magnetic energy product of the first magnetic member may be greater than a magnetic energy product of the second magnetic member, so that the magnetic field strength $B_1$ generated by the first electromagnetic excitation device may be greater than the magnetic field strength $B_2$ generated by the second electromagnetic excitation device.

In some exemplary embodiments, the first resistance $R_1$ may be less than the second resistance $R_2$. Based on the formula (1) and the formula (6), the first excitation $F_1$ generated by the first excitation device may be greater than the second excitation $F_2$ generated by the second excitation device, so that $X_1$ may be consistent with $X_2$. In this case, power of the first sound wave may be the same as power of the second sound wave, and the volume of the first sound wave heard by the user may be the same as the volume of the second sound wave. In this way, the volume difference caused by the mass difference between the first mechanical structure and the second mechanical structure may be corrected.

In some exemplary embodiments, a resistor may be connected in series outside the second coil, so that the first resistance $R_1$ may be less than the second resistance R2, to further correct the volume difference caused by the mass difference between the first mechanical structure and the second mechanical structure.

In some exemplary embodiments, the resistance $R_1$ of the first coil may be reduced and/or the resistance $R_2$ of the second coil may be increased, so that the first resistance $R_1$ may be less than the second resistance $R_2$, to further correct the volume difference caused by the mass difference between the first mechanical structure and the second mechanical structure.

Based on a formula $$R = \frac{\rho L}{S},$$

in some exemplary embodiments, the resistivity of the first coil may be increased and/or the resistivity of the second coil may be reduced, so that the resistivity of the first coil may be less than the resistivity of the second coil.

Based on the formula $$R = \frac{\rho L}{S},$$

in some exemplary embodiments, a winding length of the first coil may be increased and/or a winding length of the second coil may be reduced, so that the resistance of the first coil may be less than the resistance of the second coil.

Based on the formula $$R = \frac{\rho L}{S},$$

in some exemplary embodiments, the winding diameter of the first coil may be reduced and/or the winding diameter of the second coil may be increased, so that the resistance of the first coil may be less than the resistance of the second coil.

It should be noted that when the resistivity, the winding length, and/or the winding diameter of the first coil and/or the second coil are/is increased and/or reduced, mass of the first coil and/or the second coil may also change. However, the mass of the coil also affects the vibration of the first mechanical structure. Therefore, when parameters such as the resistivity, the winding length, and/or the winding diameter are adjusted, impact of other parameters also needs to be considered, so that the amplitude of the first mechanical structure may be consistent with the amplitude of the second mechanical structure.

In some exemplary embodiments, a power amplification circuit may be disposed in the sound output device. The power amplification circuit may be disposed between the first speaker and the signal processing circuit. The first electrical signal output by the signal processing circuit may pass through the power amplification circuit. The power amplification circuit may amplify the first electrical signal and may output the first electrical signal to the first speaker. The first speaker may receive the amplified first electrical signal. Thus, the first excitation $F_1$ generated by the first speaker may be greater than the second excitation $F_2$ generated by the second speaker (that is, $F_1>F_2$). With reference to the formula (6), the first excitation $F_1$ is greater than the second excitation $F_2$, so that $X_1$ may be consistent with $X_2$. In this case, power of the first sound wave may be the same as power of the second sound wave, and the volume of the first sound wave heard by the user may be the same as the volume of the second sound wave. In this way, the volume difference caused by the mass difference between the first mechanical structure and the second mechanical structure may be corrected.

In some exemplary embodiments, a power attenuation circuit may be disposed in the sound output device. The power attenuation circuit may be disposed between the second speaker and the signal processing circuit. The second electrical signal output by the signal processing circuit may pass through the power attenuation circuit. The power attenuation circuit may attenuate the second electrical signal and outputs the second electrical signal to the second speaker. The second speaker may receive the attenuated second electrical signal. Thus, the second excitation $F_2$ generated by the second speaker may be less than the first excitation $F_1$ generated by the first speaker (that is, $F_1>F_2$). With reference to the formula (6), the first excitation $F_1$ is greater than the second excitation $F_2$, so that $X_1$ may be consistent with $X_2$. In this case, power of the first sound wave may be the same as power of the second sound wave, and the volume of the first sound wave heard by the user may be the same as the volume of the second sound wave. In this way, the volume difference caused by the mass difference between the first mechanical structure and the second mechanical structure may be corrected.

Based on the foregoing description, when there is a volume difference between two ends of the earphone, an shift of a sensory sound source perceived by the user may be caused by the volume difference. Therefore, the sound output device needs to be designed properly to reduce the shift of the sensory sound source output by the sound output device as much as possible.

Therefore, the present disclosure further provides a sound output device. The sound output device may include but is not limited to an earphone, a hearing aid, a helmet, or the like, or any combination thereof. The earphone may include but is not limited to a wired earphone, a wireless earphone, a Bluetooth earphone, or the like, or any combination thereof. Specifically, the sound output device may include a first speaker, a second speaker, and a signal processing circuit.

The signal processing circuit may receive target sound information, process the target sound information, and generate a first electrical signal and a second electrical signal.

The first speaker may be electrically connected to the signal processing circuit. The first speaker may receive the first electrical signal from the signal processing circuit and convert the first electrical signal into a first sound wave. In some exemplary embodiments, the first speaker may include a first bone-conduction speaker, and the first sound wave may include a first bone-conducted sound wave. In some exemplary embodiments, the first speaker may convert the received first electrical signal into a mechanical vibration. Further, the first sound wave may be generated by the mechanical vibration. In some exemplary embodiments, the first speaker may include a first mechanical structure and a first excitation device. The first excitation device may generate a first excitation based on the first electrical signal. The first excitation, as an external force, may excite the first mechanical structure to vibrate. Further, the first mechanical structure may vibrate to generate the first sound wave.

The second speaker may be electrically connected to the signal processing circuit. The second speaker may receive the second electrical signal from the signal processing circuit and convert the second electrical signal into a second sound wave. In some exemplary embodiments, the second speaker may include a second bone-conduction speaker, and the second sound wave may include a second bone-conducted sound wave. In some exemplary embodiments, the second speaker may convert the received second electrical signal into a mechanical vibration. Further, the second sound wave may be generated by the mechanical vibration. In some exemplary embodiments, the second speaker may include a second mechanical structure and a second excitation device. The second excitation device may generate a second excitation based on the second electrical signal. The second excitation, as an external force, may excite the second mechanical structure to vibrate. Further, the second mechanical structure may vibrate to generate the second sound wave.

In some exemplary embodiments, the first excitation device and the second excitation device may be electromagnetic excitation devices. A value of the first excitation and a value of the second excitation may be obtained through calculation based on the formula (1). A vibration process of the first mechanical structure and the second mechanical structure may be expressed by the formula (6).

For ease of description, in the following description of the present disclosure, $F_1$ indicates the value of the first excitation, $F_2$ indicates the value of the second excitation, $M_1$ indicates mass of the first mechanical structure, $M_2$ indicates mass of the second mechanical structure, $S_1$ indicates a winding cross-sectional area of a first coil, $S_2$ indicates a winding cross-sectional area of a second coil, $\rho_1$ indicates a winding resistivity of the first coil, $\rho_2$ indicates a winding resistivity of the second coil, $B_1$ indicates a magnetic field strength of a first magnetic member, $B_2$ indicates a magnetic field strength of a second magnetic member, $R_1$ indicates a winding resistance of the first coil (hereinafter referred to as a first resistance), $R_2$ indicates a winding resistance of the second coil (hereinafter referred to as a second resistance), $X_1$ indicates an amplitude of the first mechanical structure, and $X_2$ indicates an amplitude of the second mechanical structure.

Given input electrical signals with a same amplitude and frequency, volume of a sound wave output by the first speaker may be lower than volume of a sound wave output by the second speaker. For example, in some exemplary embodiments, mass $M_1$ of the first mechanical structure may be greater than mass $M_2$ of the second mechanical structure, and consequently, given the input electrical signals with the same amplitude and frequency, volume of the sound wave output by the first speaker is lower than volume of the sound wave output by the second speaker. Referring to the formula (1) and the formula (6), assuming that both an amplitude and a frequency of the first electrical signal are the same as those of the second electrical signal (that is, $U_1=U_2$), and that the first excitation device and the second excitation device are the same (that is, $B_1=B_2$, $S_1=S_2$, $\rho_1=\rho_2$, and $R_1=R_2$), without considering damping and rigidity differences (that is, $C_1=C_2$, and $K_1=K_2$), it may be concluded based on the formula (1) and the formula (6) that the first excitation $F_1$ and the second excitation $F_2$ are the same ($F_1=F_2$). Based on the foregoing assumption, because $M_1>M_2$, as may be known from a relationship between mass and an amplitude, the amplitude of the first mechanical structure may be less than the amplitude of the second mechanical structure. When transmission media and transmission distances are the same, volume of the sound wave generated by the first speaker and heard by a user is lower than volume of the sound wave generated by the second speaker. For example, given input electrical signals with a same amplitude and frequency, a volume difference between the first sound wave and the second sound wave is not greater than 3 dB.

For ease of description, in the following description of the present disclosure, in some exemplary embodiments, the first sound wave may be transmitted to a left ear of the user and the second sound wave may be transmitted to a right ear of the user. Assuming that all information other than the volume are held constant for the first sound wave and the second sound wave, based on a binaural effect, when the volume of the first sound wave heard by the left ear of the user is lower than the volume of the second sound wave heard by the right ear of the user, the brain of the user may determine that a sound generation location (that is, a sensory sound source perceived by the user) of the target sound information leans to a right side, that is, one side of the second sound wave with higher volume.

Based on the binaural effect, a "phase difference" and/or a "time difference" may be used to resolve a sensory sound source shift caused by the "volume difference".

In some exemplary embodiments, a first duration $t_1$ may be required for the sound output device 300 to convert the target sound information 10 into the first sound wave 21 and a second duration $t_2$ may be required for the sound output device 300 to convert the target sound information 10 into the second sound wave 22; and the first duration $t_1$ may be shorter than the second duration $t_2$ by one time difference $\delta_t$. Therefore, a moment when the first speaker 310 generates a sound is earlier than a moment when the first speaker 310 generates a sound by the time difference $\delta_t$. In some exemplary embodiments, the time difference $\delta_t$ is not greater than 3 ms. Specifically, the time difference $\delta_t$ may be any one of the following values or any value between any two of the following values: 0.1 ms, 0.2 ms, 0.3 ms, 0.4 ms, 0.5 ms, 0.6 ms, 0.7 ms, 0.8 ms, 0.9 ms, 1.0 ms, 1.1 ms, 1.2 ms, 1.3 ms, 1.4 ms, 1.5 ms, 1.6 ms, 1.7 ms, 1.8 ms, 1.9 ms, 2.0 ms, 2.1 ms, 2.2 ms, 2.3 ms, 2.4 ms, 2.5 ms, 2.6 ms, 2.7 ms, 2.8 ms, 2.9 ms, and 3.0 ms. For example, the time difference $\delta_t$ may be 1.0 ms, or a value slightly greater than 1.0 ms. Assuming that all other information than the time of sound generation are held constant for the first sound wave 21 and the second sound wave 22. When transmission media and transmission distances are the same, a moment when hearing the first sound wave 21 by the left ear of the user is earlier than a moment when hearing the second sound wave 22. Based on the binaural effect, a source location (that is, a sensory sound source perceived by the user) of the target sound information 10 heard by the user may be corrected.

In some exemplary embodiments, the time difference may occur in a process in which the first speaker converts the first electrical signal into the first sound wave and the second speaker converts the second electrical signal into the second sound wave. For example, a time advancement circuit may be disposed in the first speaker and/or a time delay circuit may be disposed in the second speaker, so that the first sound wave output by the first speaker may be earlier than the second sound wave output by the second speaker. In some exemplary embodiments, the first sound wave may be earlier than the second sound wave by one time difference $\delta_t$.

In some exemplary embodiments, the time difference may occur in a process in which the sound output device converts the target sound information into the first electrical signal and the second electrical signal. For example, a time processing circuit may be disposed in the signal processing circuit, so that the first electrical signal input to the first speaker is earlier than the second electrical signal input to the second speaker. In some exemplary embodiments, the first electrical signal may be earlier than the second electrical signal by one time difference $\delta_t$.

In some exemplary embodiments, there may be a first phase difference $\delta_{w1}$ between the second sound wave and the first sound wave. In some exemplary embodiments, a phase of the first sound wave may be greater than a phase of the second sound wave by $\delta_{w1}$. Assuming that all other information than the phases stays constant for the first sound wave and the second sound wave, based on the binaural effect, the brain of the user may determine that a source location (that is, a sensory sound source perceived by the user) of the target sound information leans to one side of the first sound wave with a larger phase, that is, a left side of the user. Therefore, considering a right shift of the sensory sound source due to the volume of the first sound wave is lower than the volume of the second sound wave, the source location of the target sound information heard by the user may be adjusted to a center position. This may offset the sensory sound source shift due to the mass of the first mechanical structure being greater than the mass of the second mechanical structure.

In some exemplary embodiments, a phase of the second electrical signal may be the same as a phase of the first electrical signal. For example, the signal processing circuit may process the target sound information, so that the phase of the generated first electrical signal may be the same as the phase of the second electrical signal. Further, a phase delay circuit may be disposed in the second speaker. The phase delay circuit may delay the second electrical signal by $\delta_{w1}$, and may generate the second sound wave in which the phase is also delayed by $\delta_{w1}$. Therefore, the phase of the first sound wave may be greater than the phase of the second sound wave by $\delta_{w1}$. This may offset the sensory sound source shift due to the mass of the first mechanical structure being greater than the mass of the second mechanical structure.

In some exemplary embodiments, there may be a second phase difference $\delta_{w2}$ between the second electrical signal and the first electrical signal; and the second phase difference $\delta_{w2}$ may be the same as the first phase difference $\delta_{w1}$. For example, a phase delay circuit may be disposed in the signal processing circuit. The signal processing circuit may process the target sound information to obtain the first electrical signal and the second electrical signal. In addition, there may be the second phase difference $\delta_{w2}$ between the first electrical signal and the second electrical signal. For example, a phase of the first electrical signal may be greater than a phase of the second electrical signal by $\delta_{w2}$. The first speaker and the second speaker do not change the phase of the first electrical signal and the phase of the second electrical signal. Therefore, the phase of the first sound wave generated by the first speaker may be greater than the phase of the second sound wave generated by the second speaker by $\delta_{w2}$. $\delta_{w2}$ is the same as $\delta_{w1}$, that is, the phase of the final first sound wave is greater than the phase of the final second sound wave by $\delta_{w1}$. This may also offset the sensory sound source shift due to the mass of the first mechanical structure being greater than the mass of the second mechanical structure.

Therefore, for the target sound information, the moment when the first speaker generates the sound is earlier than the moment when the second speaker generates the sound. Assuming that all other information except the time of sound generation stays the same for the first sound wave and the second sound wave. When transmission media and transmission distances are the same, the moment when hearing the first sound wave by the left ear of the user is earlier than the moment when hearing the second sound wave by the right ear of the user. Based on the binaural effect, the brain of the user may perceive that a source location of the target sound information leans to a side of the first sound wave in which the sound is generated earlier, that is, the left side of the user. Therefore, considering the right shift of the sensory sound source due to the volume of the first sound wave being lower than the volume of the second sound wave, the source location (that is, the sensory sound source perceived by the user) of the target sound information heard by the user may be adjusted to the center position. This may offset the right shift of the sensory sound source due to the mass of the first mechanical structure being greater than the mass of the second mechanical structure.

As described above, in some exemplary embodiments, the present disclosure provides a sensory sound source adjustment method S100, a volume adjustment method S200, and two sound output devices. The sensory sound source adjustment method S100 in some exemplary embodiments of the present disclosure may include: S110, obtaining a volume difference between the first sound wave and the second sound wave; and S120, adjusting a sound generation time difference between the first sound wave and the second sound wave. The volume adjustment method S200 in some exemplary embodiments of the present disclosure may include: S210, obtaining a volume difference between the first sound wave and the second sound wave; and S220, adjusting an amplitude difference between the first excitation and the second excitation. In the sound output device and the sensory sound source adjustment method S100 in some exemplary embodiments of the present disclosure, the shift of the sensory sound source perceived by the user due to the mass difference between the first mechanical structure and the second mechanical structure may be corrected by setting the time difference between the first sound wave and the second sound wave. In the sound output device and the volume adjustment method in some exemplary embodiments of the present disclosure, the volume difference between the first speaker and the second speaker due to the mass difference between the first mechanical structure and the second mechanical structure may be corrected by setting different coil resistivities, coil winding diameters, magnetic field strengths, and/or resistances.

It should be noted that the scope of the present disclosure is not limited by the transmission media of the first sound wave and/or the second sound wave in the present disclosure. The first sound wave and/or the second sound wave in the present disclosure may be transmitted through a solid substance (for example, bones), and the first sound wave and/or the second sound wave may be transmitted by gas (for example, air). In some exemplary embodiments, the transmission media may include one or a combination of air and bones.

It should be noted that in actual design and manufacturing, the volume adjustment method, the sensory sound source adjustment method, and the sound output device in the present disclosure may be used in combination, to achieve a desired adjustment. For example, in some exemplary embodiments, the sensory sound source adjustment method S100 may be separately used to adjust the sensory sound source output by the sound output device. For example, in some exemplary embodiments, the volume adjustment method S200 and the sensory sound source adjustment method S100 may be used simultaneously to adjust the sensory sound source and the sound volume output by the sound output device.

For example, a mass adjustment and an excitation adjustment may be performed simultaneously. For example, when $M_1>M_2$, methods such as "increasing the mass of the second mechanical structure 311", "increasing the first excitation", and "increasing the diameter of the first coil" may be used simultaneously, so that the volume of the first speaker 310 may be consistent with the volume of the second speaker 320.

For example, when $M_1>M_2$, methods such as "increasing the mass of the second mechanical structure 311", "increasing the first excitation", and "reducing the diameter of the second coil" may be used simultaneously, so that the volume difference between the first speaker 310 and the second speaker 320 may be maintained within a target volume difference range; and then a method for setting a phase difference may be used simultaneously to adjust the sensory sound source.

It should be noted that the requirement in which the volume of the first speaker and the volume of the second speaker remain "consistent" or "the same", is only for the ease of analysis, and should not constitute a limitation on the protection scope of the present disclosure. The volume of the first speaker remains consistent with or the same as the volume of the second speaker may be that the volume difference between the first speaker and the second speaker is maintained within the target volume difference range.

It should be noted that the requirement in which the sensory sound source of the sound output device is "centered" in the present disclosure is only for the ease of analysis, and should not constitute a limitation on the protection scope of the present disclosure. The sensory sound source is centered may be that the sensory sound source is maintained in a target location range.

In summary, after reading details of the present disclosure, a person skilled in the art may understand that details of the present disclosure may be presented by some exemplary embodiments, and may not be limiting. A person skilled in the art may understand that the present disclosure is intended to cover various reasonable changes, improvements, and modifications to the exemplary embodiments, although this is not specified herein. These changes, improvements, and modifications are intended to be proposed in the present disclosure and are within the spirit and scope of the exemplary embodiments of the present disclosure.

The terms used herein are only intended to describe some exemplary embodiments and are not restrictive. For example, unless otherwise clearly indicated in a context, the terms "a", "an", "said", and "the" in singular forms may also include plural forms. When used in this specification, the terms "comprising", "including", and/or "containing" indicate presence of associated integers, steps, operations, elements, and/or components. However, this does not exclude presence of one or more other features, integers, steps, operations, elements, components, and/or groups or addition of other features, integers, steps, operations, elements, components, and/or groups to the system/method. When used in this disclosure, the term "A is above B" may mean that A is directly adjacent to B (above or below B), or may mean that A is indirectly adjacent to B (that is, A and B are separated by some substances); and the term "A is in B" may mean that A is completely in B, or may mean that A is partially in B.

In addition, some terms in the present disclosure are used to describe the embodiments of the present disclosure. For example, "one embodiment", "an embodiment", and/or "some embodiments" mean/means that a specific feature, structure, or characteristic described with reference to the embodiment(s) may be included in at least one embodiment of the present disclosure. Therefore, it should be emphasized and should be understood that two or more references to "an embodiment" or "one embodiment" or "alternative embodiment" in various parts of this specification do not necessarily all refer to the same embodiment. In addition, specific features, structures, or characteristics may be appropriately combined in one or more embodiments of the present disclosure.

It should be understood that in the foregoing description of the exemplary embodiments of the present disclosure, to facilitate understanding of one feature, for the purpose of simplifying the present disclosure, various features in the present disclosure are sometimes combined in a single exemplary embodiment, single drawing, or description thereof. Alternatively, various features in the present disclosure are distributed in a plurality of exemplary embodiments of the present disclosure. However, this does not mean that the combination of these features is necessary. It is entirely possible for a person skilled in the art to extract some of the features as a separate exemplary embodiment for understanding when reading the present disclosure. In other words, an exemplary embodiment in the present disclosure may also be understood as an integration of a plurality of sub-embodiments. It is also true when content of each sub-embodiment is less than all features of a single exemplary embodiment disclosed above.

In some exemplary embodiments, numbers expressing quantities or properties used to describe and seek to protect some exemplary embodiments of the present disclosure should be understood as modified by the term "about", "approximately", or "basically" in some cases. For example, unless otherwise specified, the term "about", "approximately", or "basically" may mean a ±20% variation of a value described by the term. Therefore, in some exemplary embodiments, numerical parameters listed in the written description and appended claims are approximate values, which may vary according to desired properties that some exemplary embodiments are trying to achieve. In some exemplary embodiments, numerical parameters should be interpreted based on a quantity of significant figures reported and by applying common rounding techniques. Although some exemplary embodiments described in the present disclosure list a wide range of numerical values and the parameters, such range of numerical values and the parameters are only approximations, in the present disclosure, precise numerical values are provided when possible.

Each patent, patent application, patent application publication, and other materials cited herein, such as articles, books, specifications, publications, documents, and materials may be incorporated herein by reference. All content used for all purposes, except any prosecution document history related to the content, any identical prosecution document history that may be inconsistent or conflict with this document, or any identical prosecution document history that may have restrictive impact on the broadest scope of the claims, is associated with this document now or later. For example, if there is any inconsistency or conflict between descriptions, definitions, and/or use of terms associated with any material contained therein and descriptions, definitions, and/or use of terms related to this document, the terms in this document shall prevail.

Finally, it should be understood that the exemplary embodiments of the present disclosure are descriptions of principles of the exemplary embodiments of the present disclosure. Other modified embodiments may also fall within the scope of the present disclosure. Therefore, the exemplary embodiments disclosed in the present disclosure are merely exemplary and not restrictive. A person skilled in the art may use alternative configurations according to the exemplary embodiments of the present disclosure to implement the some aspects of the present disclosure. Therefore, the exemplary embodiments of the present disclosure are not limited to those precisely described in the present disclosure.

What is claimed is:

1. A sound output device, comprising:

a signal processing circuit to generate, during operation, a first electrical signal and a second electrical signal based on target sound information;

a first speaker, corresponding to a first ear of a user, electrically connected to the signal processing circuit to receive, during operation, the first electrical signal from the signal processing circuit and convert the first electrical signal into a first sound wave; and a second speaker, corresponding to a second ear of the user, electrically connected to the signal processing circuit, to receive, during operation, the second electrical signal from the signal processing circuit and convert the second electrical signal into a second sound wave, wherein when given input electrical signals with a same amplitude and frequency, volume of a sound wave output by the first speaker is lower than volume of a sound wave output by the second speaker, the sound output device converts the target sound information into the first sound wave in a first duration and further converts the target sound information into the second sound wave in a second duration, and the first duration is shorter than the second duration by a time difference so as to adjust a sensory sound source shift caused by a volume difference between the first sound wave and the second sound wave.

2. The sound output device according to claim 1, wherein when given the input electrical signals with a same amplitude and frequency, a difference between a volume of the first sound wave and a volume of the second sound wave is not greater than 3 dB.

3. The sound output device according to claim 1, wherein the first speaker generates the first sound wave by exciting a first mechanical structure; and the second speaker generates the second sound wave by exciting a second mechanical structure, wherein mass of the first mechanical structure is greater than mass of the second mechanical structure, so that when given the input electrical signals with the same amplitude and frequency, the volume of the sound wave output by the first speaker is lower than the volume of the sound wave output by the second speaker.

4. The sound output device according to claim 1, wherein the first speaker includes at least one of a first bone-conduction speaker or a first air-conduction speaker; and the second speaker includes at least one of a second bone-conduction speaker or a second air-conduction speaker.

5. The sound output device according to claim 1, wherein the time difference occurs in a process in which the sound output device converts the target sound information into the first electrical signal and the second electrical signal.

6. The sound output device according to claim 1, wherein the time difference occurs in a process in which the first speaker converts the first electrical signal into the first sound wave and the second speaker converts the second electrical signal into the second sound wave.

7. The sound output device according to claim 1, wherein the time difference is not greater than 3 ms.

8. A sound output device, comprising: a signal processing circuit to generate, during operation, a first electrical signal and a second electrical signal based on target sound information;

a first speaker, electrically connected to the signal processing circuit to receive, during operation, the first electrical signal from the signal processing circuit and convert the first electrical signal into a first excitation to excite a first mechanical structure to generate a first sound wave; and a second speaker, electrically connected to the signal processing circuit to receive, during operation, the second electrical signal from the signal processing circuit and convert the second electrical signal into a second excitation to excite a second mechanical structure to generate a second sound wave, wherein volume of the first sound wave is the same as volume of the second sound wave, and given a same excitation, sound volume generated by the first mechanical structure is lower than sound volume generated by the second mechanical structure;

the sound output device converts the target sound information into the first sound wave in a first duration and the sound output device converts the target sound information into the second sound wave in a second duration, and the first duration is shorter than the second duration by a time difference; and based on the volume difference, adjusting the time difference to adjust a sensory sound source shift caused by a volume differences between the first sound wave and the second sound wave.

9. The sound output device according to claim 8, wherein mass of the first mechanical structure is greater than mass of the second mechanical structure, so that given a same excitation, the sound volume generated by the first mechanical structure is lower than the sound volume generated by the second mechanical structure.

10. The sound output device according to claim 9, wherein the first speaker includes at least one of a first bone-conduction speaker or a first air-conduction speaker; and the second speaker includes at least one of a second bone-conduction speaker or a second air-conduction speaker.

11. The sound output device according to claim 9, wherein the first speaker further includes a first electromagnetic excitation device to generate the first excitation to excite the first mechanical structure to vibrate and generate the first sound wave; and the second speaker further includes a second electromagnetic excitation device to generate the second excitation to excite the second mechanical structure to vibrate and generate the second sound wave.

12. The sound output device according to claim 11, wherein the first electromagnetic excitation device includes a first coil with a first winding diameter;

and the second electromagnetic excitation device includes a second coil with a second winding diameter, wherein the first winding diameter is greater than the second winding diameter.

13. The sound output device according to claim 11, wherein the first electromagnetic excitation device includes a first coil with a first resistivity; and the second electromagnetic excitation device includes a second coil with a second resistivity, wherein the first resistivity is less than the second resistivity.

14. The sound output device according to claim 11, wherein given a same input current, the first excitation generated by the first electromagnetic excitation device is greater than the second excitation generated by the second electromagnetic excitation device.

15. The sound output device according to claim 11, wherein the first speaker includes a first resistance; and the second speaker includes a second resistance, wherein the first resistance is less than the second resistance.

16. The sound output device according to claim 11, further comprising:

a power amplification circuit connected to the first speaker and the signal processing circuit, wherein the power amplification circuit amplifies the first electrical signal, and the first speaker receives an amplified first electrical signal.

17. The sound output device according to claim 11, further comprising:

a power attenuation circuit connected to the second speaker and the signal processing circuit, wherein the power attenuation circuit attenuates the second electrical signal, and the second speaker receives an attenuated second electrical signal.

18. A sensory sound source adjustment method for a sound output device, comprising:

obtaining a volume difference between a first sound wave and a second sound wave generated by the sound output device, the sound output device including:

a signal processing circuit to generate, during operation, a first electrical signal and a second electrical signal based on target sound information, a first speaker, electrically connected to the signal processing circuit to receive, during operation, the first electrical signal from the signal processing circuit and convert the first electrical signal into the first sound wave, and a second speaker, electrically connected to the signal processing circuit to receive, during operation, the second electrical signal from the signal processing circuit and convert the second electrical signal into the second sound wave, wherein when given input electrical signals with a same amplitude and frequency, volume of a sound wave output by the first speaker is lower than volume of a sound wave output by the second speaker, the sound output device converts the target sound information into the first sound wave in a first duration and the sound output device converts the target sound information into the second sound wave in a second duration, and the first duration is shorter than the second duration by a time difference; and based on the volume difference, adjusting the time difference to adjust a sensory sound source shift caused by a volume difference between the first sound wave and the second sound wave.

19. The sensory sound source adjustment method according to claim 18, wherein the adjusting of the time difference includes:

adjusting a phase difference between the first sound wave and the second sound wave.

* * * * *